United States Patent
Kotaka et al.

(10) Patent No.: US 10,115,987 B2
(45) Date of Patent: Oct. 30, 2018

(54) STATE DETECTION DEVICE AND METHOD FOR FUEL CELL

(71) Applicant: NISSAN MOTOR CO., LTD., Yokohama-shi, Kanagawa (JP)

(72) Inventors: Toshikazu Kotaka, Kanagawa (JP); Tetsuya Aoki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/554,242

(22) PCT Filed: Mar. 3, 2015

(86) PCT No.: PCT/JP2015/056261
§ 371 (c)(1),
(2) Date: Aug. 29, 2017

(87) PCT Pub. No.: WO2016/139759
PCT Pub. Date: Sep. 9, 2016

(65) Prior Publication Data
US 2018/0053952 A1 Feb. 22, 2018

(51) Int. Cl.
*H01M 8/04492* (2016.01)
*H01M 8/04537* (2016.01)
(Continued)

(52) U.S. Cl.
CPC ..... *H01M 8/04492* (2013.01); *H01M 8/0485* (2013.01); *H01M 8/04529* (2013.01);
(Continued)

(58) Field of Classification Search
CPC ......... H01M 8/04492; H01M 8/04537; H01M 8/04664; H01M 8/1039; H01M 8/04641; H01M 2008/1095; H01M 2250/20
See application file for complete search history.

(56) References Cited

U.S. PATENT DOCUMENTS 9,917,315 B2 3/2018 Aoki
2006/0062982 A1* 3/2006 Hammond Cunningham ............
B01D 69/02
428/220

(Continued)

FOREIGN PATENT DOCUMENTS

EP 2908149 * 10/2013
JP 2002-367650 * 12/2002
(Continued)

OTHER PUBLICATIONS

USPTO Office Action, U.S. Appl. No. 15/554,497, dated Apr. 26, 2018, 9 pages.

*Primary Examiner* — Alexander Usyatinsky
(74) *Attorney, Agent, or Firm* — Foley & Lardner LLP

(57) ABSTRACT

A state detection device for fuel cell includes a supposed high-frequency impedance value setting unit configured to set a supposed high-frequency impedance value on the basis of an impedance measurement value belonging to an arc region of an impedance curve of the fuel cell, an actually measured high-frequency impedance value calculation unit configured to obtain an actually measured high-frequency impedance value on the basis of an impedance measurement value belonging to a non-arc region of the impedance curve of the fuel cell, and an ionomer resistance estimation unit configured to estimate a value obtained by subtracting the actually measured high-frequency impedance value from the supposed high-frequency impedance value as an ionomer resistance value. The supposed high-frequency impedance value setting unit sets a value of an intersection of an equivalent circuit impedance curve set on the basis of the impedance measurement value belonging to the arc region and a real ads as the supposed high-frequency impedance value.

18 Claims, 24 Drawing Sheets

(51) Int. Cl.
  *H01M 8/04664* (2016.01)
  *H01M 8/1039* (2016.01)
  *H01M 8/04828* (2016.01)
  *H01M 8/04858* (2016.01)
  *H01M 8/1018* (2016.01)

(52) U.S. Cl.
  CPC ... *H01M 8/04634* (2013.01); *H01M 8/04641* (2013.01); *H01M 8/04664* (2013.01); *H01M 8/04949* (2016.02); *H01M 8/1039* (2013.01); *H01M 2008/1095* (2013.01); *H01M 2250/20* (2013.01)

(56) References Cited

U.S. PATENT DOCUMENTS

| | | |
|---|---|---|
| 2010/0264930 A1 | 10/2010 | Kawase |
| 2011/0269046 A1* | 11/2011 | Suematsu ......... H01M 8/04641 429/450 |
| 2012/0145564 A1* | 6/2012 | Yamazaki ......... H01M 8/04641 205/790.5 |
| 2013/0149628 A1 | 6/2013 | Ogawa et al. |
| 2013/0244127 A1* | 9/2013 | Maeshima ........ H01M 8/04089 429/432 |
| 2013/0248106 A1* | 9/2013 | Hisamitsu ............... H01M 4/13 156/280 |
| 2013/0330646 A1 | 12/2013 | Aoki |
| 2015/0276888 A1 | 10/2015 | Sakai |
| 2018/0048006 A1 | 2/2018 | Kotaka et al. |

FOREIGN PATENT DOCUMENTS

| | | |
|---|---|---|
| JP | 2002-367650 A | 12/2002 |
| JP | 4640661 B2 | 3/2011 |
| JP | 2012-078339 A | 4/2012 |
| JP | 2013-191362 A | 9/2013 |
| JP | 2013/258042 A1 | 12/2013 |
| JP | 2014-229528 A | 12/2014 |
| WO | WO-2013/088463 A1 | 6/2013 |
| WO | WO-2014/057868 A1 | 4/2014 |

* cited by examiner

STATE DETECTION DEVICE AND METHOD FOR FUEL CELL

TECHNICAL FIELD

This invention relates to a state detection device and a state detection method for fuel cell.

BACKGROUND ART

It is known to use an electrolyte membrane resistance calculated from an HFR (High Frequency Resistance) for the detection of a wet/dry state of a fuel cell as an example of a method for estimating a state of a fuel cell. However, since a value calculated from the HFR includes not only a pure electrolyte membrane resistance component, but also electron transport resistance components such as a bulk resistance and a contact resistance, an error has been large for the detection of the wet/dry state of the fuel cell.

Accordingly, it is proposed in Japanese Patent No. 4640661 (patent literature 1) to calculate each of a first impedance in a first frequency region corresponding to an electrolyte membrane resistance and a second impedance in a second frequency region, which is a region corresponding to the sum of the electrolyte membrane resistance and a catalyst layer resistance and lower than the first frequency region, and calculate a catalyst layer water content serving as an index of a degree of wetness of a fuel cell on the basis of a differential impedance between the second and first impedances.

Further, it is proposed in JP2013-258042A (patent literature 2) to calculate an ionomer resistance on the basis of an equation supposed from an imaginary part of a measured impedance and use this ionomer resistance as a dry/wet index of a fuel cell.

SUMMARY OF INVENTION

However, since the difference between the second and first impedances includes a reaction resistance component of each electrode as an error in the method of patent literature 1, the accuracy of the catalyst layer water content calculated on the basis of this is low. Further, in the method of patent literature 2, the equation supposed for the calculation of the ionomer resistance does not take into account distributions in a thickness direction of the fuel cell and a flow passage length direction and the like and does not have sufficient accuracy.

The present invention was developed, focusing on such a problem, and aims to provide a state detection device and a state detection method for fuel cell capable of accurately detecting a state of a fuel cell.

According to one aspect of the present invention, a state detection device for fuel cell is provided Further, the state detection device for fuel cell includes a supposed high-frequency impedance value setting unit configured to set a supposed high-frequency impedance value on the basis of an impedance measurement value belonging to an arc region of an impedance curve of the fuel cell, an actually measured high-frequency impedance value calculation unit configured to obtain an actually measured high-frequency impedance value on the basis of an impedance measurement value belonging to a non-arc region of the impedance curve of the fuel cell, and an ionomer resistance estimation unit configured to estimate a value obtained by subtracting the actually measured high-frequency impedance value from the supposed high-frequency impedance value as an ionomer resistance value. In the state detection device for fuel cell, the supposed high-frequency impedance value setting unit sets a value of an intersection of an equivalent circuit impedance curve set on the basis of an impedance measurement value belonging to the arc region and a real axis as the supposed high-frequency impedance value.

DESCRIPTION OF EMBODIMENTS

Hereinafter, embodiments of the present invention are described with reference to the drawings and the like.

A unit cell of a fuel cell is configured such that an electrolyte membrane is sandwiched by an anode electrode serving as a fuel electrode and a cathode electrode serving as an oxidant electrode. The unit cell of the fuel cell generates power using anode gas containing hydrogen and supplied to the anode electrode and cathode gas containing oxygen and supplied to the cathode electrode. Electrode reactions which proceed in both anode and cathode electrodes are as follows.

Anode electrode: $2H_2 \rightarrow 4H^+ + 4e^-$    (1)

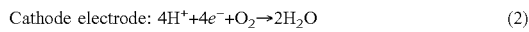

Cathode electrode: $4H^+ + 4e^- + O_2 \rightarrow 2H_2O$    (2)

The unit cell of the fuel cell generates an electromotive force of about 1 V (volt) by these electrode reactions (1), (2).

Figure 1:
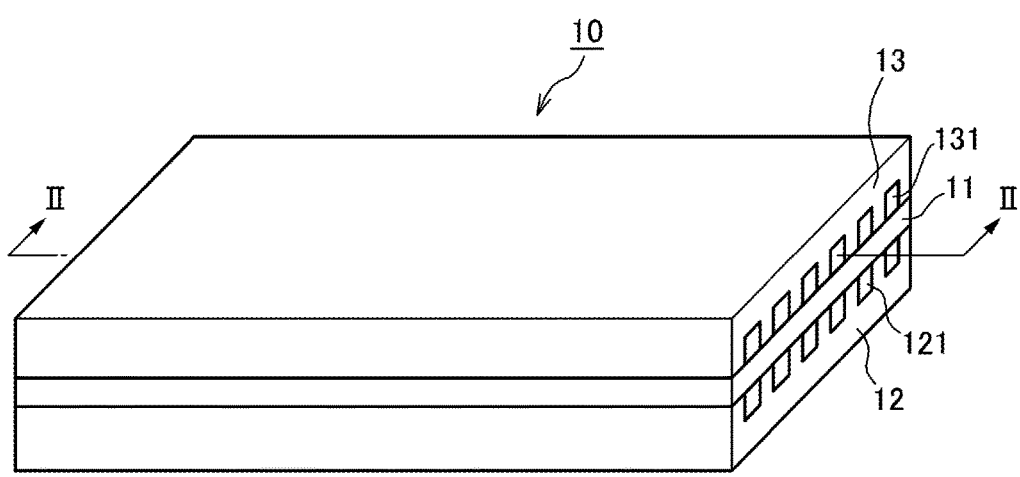
FIG. 1 is a perspective view of a fuel cell according to one embodiment of the present invention.
Figure 2:
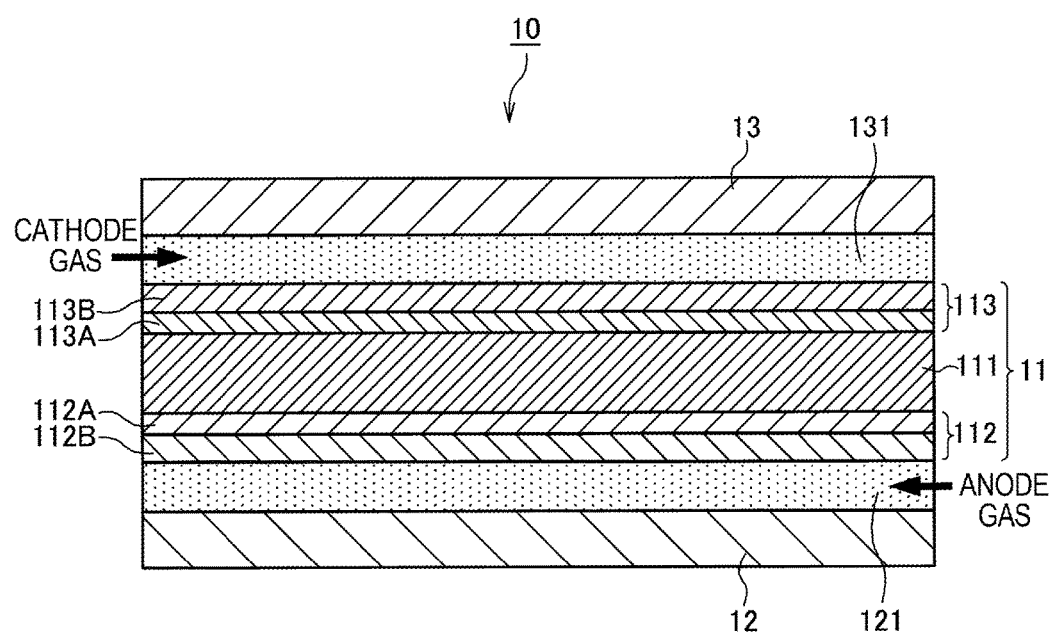
FIG. 2 is a sectional view along II-II of the fuel cell of FIG. 1.

FIGS. 1 and 2 are views showing the configuration of a unit cell of the fuel cell 10 according to one embodiment of the present invention. FIG. 1 is a perspective view of the unit cell of the fuel cell 10. FIG. 2 is a sectional view along II-II of the unit cell of the fuel cell 10 of FIG. 1.

As shown in FIGS. 1 and 2, the unit cell of the fuel cell 10 includes a membrane electrode assembly (MEA) 11, and an anode separator 12 and a cathode separator 13 arranged to sandwich the MEA 11.

The MEA 11 is composed of an electrolyte membrane 111, an anode electrode 112 and a cathode electrode 113. The MEA 11 includes the anode electrode 112 on one surface side of the electrolyte membrane 111 and the cathode electrode 113 on the other surface side.

The electrolyte membrane 111 is a proton conductive ion exchange membrane formed of fluororesin. The electrolyte membrane 111 exhibits good electrical conductivity in a wet state. It should be noted that another material such as a material having a phosphoric acid ($H_3PO_4$) impregnated in a predetermined matrix may be used as the electrolyte member 111 according to a possible response of a fuel cell.

The anode electrode 112 includes a catalyst layer 112A and a gas diffusion layer 112B. The catalyst layer 112A is a member formed of Pt or carbon black particles carrying Pt or the like and provided in contact with the electrolyte membrane 111. The gas diffusion layer 112B is provided on an outer side of the catalyst layer 112A. The gas diffusion layer 112B is a member formed of carbon cloth having gas diffusion property and electrical conductivity and provided in contact with the catalyst layer 112A and the anode separator 12.

Similarly to the anode electrode 112, the cathode electrode 113 also includes a catalyst layer 113A and a gas diffusion layer 113B. The catalyst layer 113A is arranged between the electrolyte membrane 111 and the gas diffusion layer 113B and the gas diffusion layer 113B is arranged between the catalyst layer 113A and the cathode separator 13.

The anode separator 12 is arranged on an outer side of the gas diffusion layer 112B. The anode separator 12 includes a plurality of anode gas flow passages 121 for supplying anode gas (hydrogen gas) to the anode electrode 112. The anode gas flow passages 121 are formed as groove-like passages.

The cathode separator 13 is arranged on an outer side of the gas diffusion layer 113B. The cathode separator 13 includes a plurality of cathode gas flow passages 131 for supplying cathode gas (air) to the cathode electrode 113. The cathode gas flow passages 131 are formed as groove-like passages.

The anode separator 12 and the cathode separator 13 are so configured that the anode gas flowing in the anode gas flow passages 121 and the cathode gas flowing in the cathode gas flow passages 131 flow in directions opposite to each other. It should be noted that the anode separator 12 and the cathode separator 13 may be so configured that these gases flow in the same direction.

In the case of using such a unit cell of the fuel cell 10 as a power source for an automotive vehicle, a fuel cell stack in which several hundreds of unit cells of the fuel cell 10 are laminated is used since required power is large. Power for driving the vehicle is taken out by configuring a fuel cell system for supplying anode gas and cathode gas to the fuel cell stack.

Figure 3:
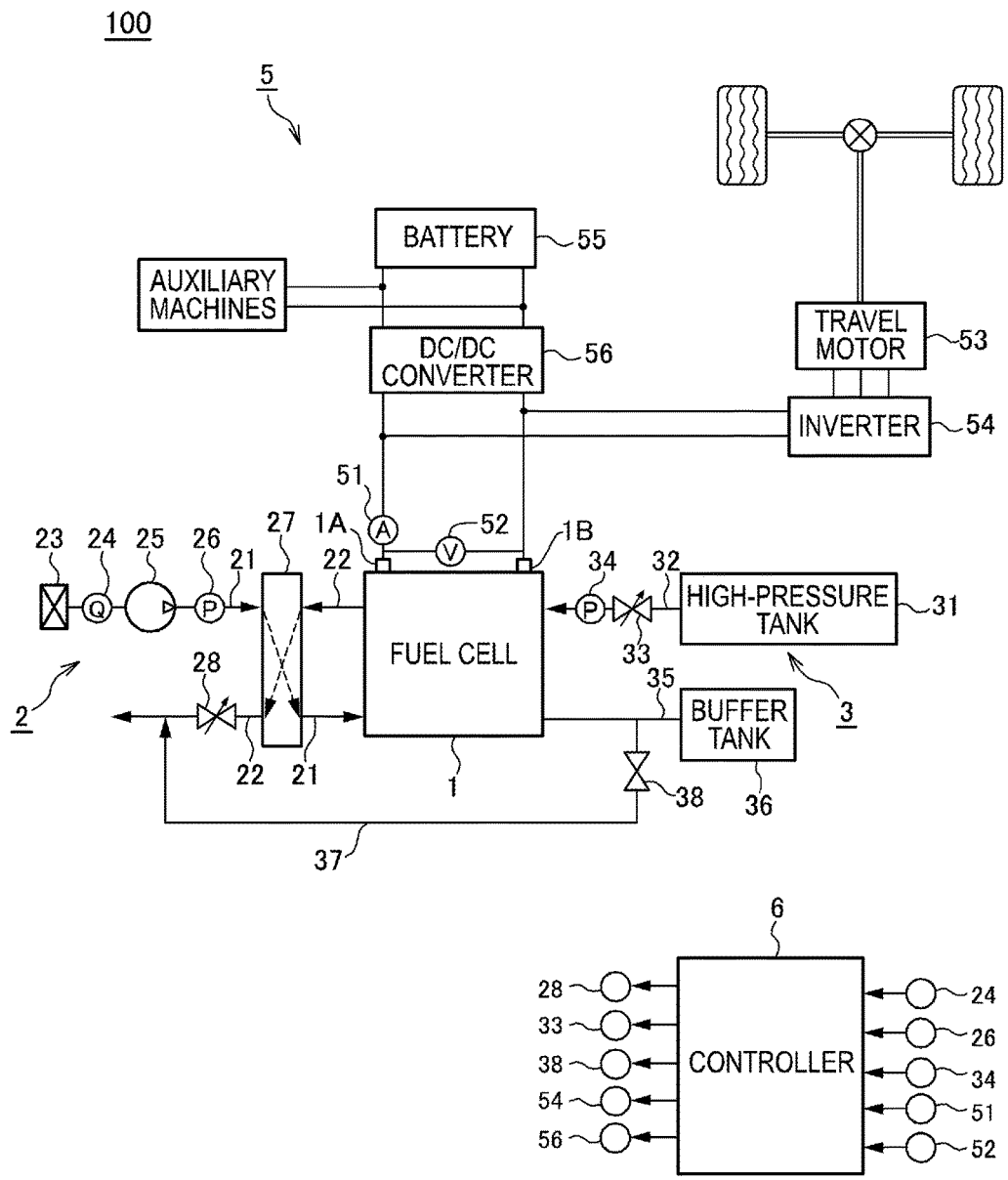
FIG. 3 is a schematic configuration diagram of a fuel cell system according to the one embodiment of the present invention.

FIG. 3 is a schematic diagram of a fuel cell system 100 according to one embodiment of the present invention.

The fuel cell system 100 includes a fuel cell 1, a cathode gas supplying/discharging device 2, an anode gas supplying/discharging device 3, a power system 5 and a controller 6.

The fuel cell 1 is a laminated battery formed by laminating a plurality of unit cells of the fuel cell 10 as described above. The fuel cell 1 generates power necessary to drive a vehicle upon receiving the supply of the anode gas and the cathode gas. The fuel cell 1 includes an anode electrode side terminal 1A and a cathode electrode side terminal 1B as output terminals for taking out power.

The cathode gas supplying/discharging device 2 supplies the cathode gas to the fuel cell 1 and discharges cathode off-gas discharged from the fuel cell 1 to outside. The cathode gas supplying/discharging device 2 includes a cathode gas supply passage 21, a cathode gas discharge passage 22, a filter 23, an air flow sensor 24, a cathode compressor 25, a cathode pressure sensor 26, a water recovery device (WRD) 27 and a cathode pressure control valve 28.

The cathode gas supply passage 21 is a passage in which the cathode gas to be supplied to the fuel cell 1 flows. One end of the cathode gas supply passage 21 is connected to the filter 23 and the other end is connected to a cathode gas inlet part of the fuel cell 1.

The cathode gas discharge passage 22 is a passage in which the cathode off-gas discharged from the fuel cell 1 flows. One end of the cathode gas discharge passage 22 is connected to a cathode gas outlet part of the fuel cell 1 and the other end is formed as an opening end. The cathode off-gas is mixture gas containing the cathode gas, steam produced by the electrode reaction and the like.

The filter 23 is a member for removing dust, dirt and the like contained in the cathode gas to be taken into the cathode gas supply passage 21.

The cathode compressor 25 is provided downstream of the filter 23 in the cathode gas supply passage 21. The cathode compressor 25 supplies the cathode gas in the cathode gas supply passage 21 to the fuel cell 1 by feeding the cathode gas under pressure.

The air flow sensor 24 is provided between the filter 23 and the cathode compressor 25 in the cathode gas supply passage 21. The air flow sensor 24 detects a flow rate of the cathode gas to be supplied to the fuel cell 1.

The cathode pressure sensor 26 is provided between the cathode compressor 25 and the WRD 27 in the cathode gas supply passage 21. The cathode pressure sensor 26 detects a pressure of the cathode gas to be supplied to the fuel cell 1. The cathode gas pressure detected by the cathode pressure sensor 26 represents a pressure of an entire cathode system including the cathode gas flow passages of the fuel cell 1 and the like.

The WRD 27 is connected over the cathode gas supply passage 21 and the cathode gas discharge passage 22. The WRD 27 is a device for recovering moisture in the cathode off-gas flowing in the cathode gas discharge passage 22 and humidifying the cathode gas flowing in the cathode gas supply passage 21 using that recovered moisture.

The cathode pressure control valve 28 is provided downstream of the WRD 27 in the cathode gas discharge passage 22. The cathode pressure control valve 28 is controlled to open and close by the controller 6 and adjusts the pressure of the cathode gas to be supplied to the fuel cell 1.

Next, the anode gas supplying/discharging device 3 is described.

The anode gas supplying/discharging device 3 supplies the anode gas to the fuel cell 1 and discharges anode off-gas discharged from the fuel cell 1 to the cathode gas discharge passage 22. The anode gas supplying/discharging device 3 includes a high-pressure tank 31, an anode gas supply passage 32, an anode pressure control valve 33, an anode pressure sensor 34, an anode gas discharge passage 35, a buffer tank 36, a purge passage 37 and a purge valve 38.

The high-pressure tank 31 is a container for storing the anode gas to be supplied to the fuel cell 1 in a high-pressure state.

The anode gas supply passage 32 is a passage for supplying the anode gas discharged from the high-pressure tank 31 to the fuel cell 1. One end of the anode gas supply passage 32 is connected to the high-pressure tank 31 and the other end is connected to an anode gas inlet part of the fuel cell 1.

The anode pressure control valve 33 is provided downstream of the high-pressure tank 31 in the anode gas supply passage 32. The anode pressure control valve 33 is controlled to open and close by the controller 6 and adjusts a pressure of the anode gas to be supplied to the fuel cell 1.

The anode pressure sensor 34 is provided downstream of the anode pressure control valve 33 in the anode gas supply passage 32. The anode pressure sensor 34 detects a pressure of the anode gas to be supplied to the fuel cell 1. The anode gas pressure detected by the anode pressure sensor 34 represents a pressure of an entire anode system including the buffer tank 36, the anode gas flow passages of the fuel cell 1 and the like.

The anode gas discharge passage 35 is a passage in which the anode off-gas discharged from the fuel cell 1 flows. One end of the anode gas discharge passage 35 is connected to an anode gas outlet part of the fuel cell 1 and the other end is connected to the buffer tank 36. The anode off-gas contains the anode gas not used in the electrode reaction, impurity gas such as nitrogen having leaked from the cathode gas flow passages 131 to the anode gas flow passages 121, moisture and the like.

The buffer tank 36 is a container for temporarily storing the anode off-gas flowing from the anode gas discharge passage 35. The anode off-gas pooled in the buffer tank 36 is discharged to the cathode gas discharge passage 22 through the purge passage 37 when the purge valve 38 is opened.

The purge passage 37 is a passage for discharging the anode off-gas. One end of the purge passage 37 is connected to the anode gas discharge passage 35 and the other end is connected to a part of the cathode gas discharge passage 22 downstream of the cathode pressure control valve 28.

The purge valve 38 is provided in the purge passage 37. The purge valve 38 is controlled to open and close by the controller 6 and controls a purge flow rate of the anode off-gas discharged from the anode gas discharge passage 35 to the cathode gas discharge passage 22.

When a purge control is executed to open the purge valve 38, the anode off-gas is discharged to outside through the purge passage 37 and the cathode gas discharge passage 22. At this time, the anode off-gas is mixed with the cathode off-gas in the cathode gas discharge passage 22.

By mixing the anode off-gas and the cathode off-gas and discharging the mixture gas to outside in this way, an anode gas concentration (hydrogen concentration) in the mixture gas is set at a value equal to or lower than a discharge allowable concentration.

The power system 5 includes a current sensor 51, a voltage sensor 52, a travel motor 53, an inverter 54, a battery 55 and a DC/DC converter 56.

The current sensor 51 detects an output current extracted from the fuel cell 1. The voltage sensor 52 detects an output voltage of the fuel cell 1, i.e. an inter-terminal voltage between the anode electrode side terminal 1A and the cathode electrode side terminal 1B.

It should be noted that the voltage sensor 52 may be configured to detect a voltage of each unit cell of the fuel cell 10 or may be configured to detect a voltage of each group composed of a plurality of the unit cells of the fuel cell 10.

The travel motor 53 is a three-phase alternating-current synchronous motor and a drive source for driving wheels. The travel motor 53 has a function serving as a motor to be rotationally driven upon receiving the supply of power from the fuel cell 1 and the battery 55 and a function serving as a generator for generating power by being rotationally driven by an external force.

The inverter 54 is composed of a plurality of semiconductor switches such as IGBTs. The semiconductor switches of the inverter 54 are switching-controlled by the controller 6, thereby converting direct-current power into alternating-current power or alternating-current power into direct-current power. The inverter 54 converts composite direct-current power of output power of the fuel cell 1 and output power of the battery 55 into three-phase alternating-current power and supplies this power to the travel motor 53 when the travel motor 53 is caused to function as the motor. In contrast, the inverter 54 converts regenerative power (three-phase alternating-current power) of the travel motor 53 into direct-current power and supplies this power to the battery 55 when the travel motor 53 is caused to function as the generator.

The battery 55 is configured to be charged with a surplus of the output power of the fuel cell 1 and the regenerative power of the travel motor 53. The power charged into the battery 55 is supplied to the travel motor 53 and auxiliary machines such as the cathode compressor 25 if necessary.

The DC/DC converter 56 is a bidirectional voltage converter for increasing and decreasing the output voltage of the fuel cell 1. By controlling the output voltage of the fuel cell 1 by the DC/DC converter 56, the output current of the fuel cell 1 and the like are adjusted.

The controller 6 is configured by a microcomputer including a central processing unit (CPU), a read-only memory (ROM), a random access memory (RAM) and an input/output interface (I/O interface). To the controller 6 are input signals from sensors such as an accelerator stroke sensor (not shown) for detecting a depressed amount of an accelerator pedal besides signals from various sensors such as the current sensor 51 and the voltage sensor 52.

The controller 6 adjusts the pressures and flow rates of the anode gas and the cathode gas to be supplied to the fuel cell 1 by controlling the anode pressure control valve 33, the cathode pressure control valve 28, the cathode compressor 25 and the like according to an operating state of the fuel cell system 100.

Further, the controller 6 calculates target output power of the fuel cell 1 on the basis of the operating state of the fuel cell system 100. Further, the controller 6 calculates the target output power on the basis of power required by the travel motor 53, power required by the auxiliary machines such as the cathode compressor 25, charge/discharge requests of the battery 55 and the like.

Further, the controller 6 calculates a target output current of the fuel cell 1 on the basis of the calculated target output power described above by referring to an IV characteristic (current-voltage characteristic) of the fuel cell 1 determined in advance. Then, the controller 6 controls the output voltage of the fuel cell 1 by the DC/DC converter 56 such that the output current of the fuel cell 1 reaches the target output current, and executes a control to supply a necessary current to the travel motor 53 and the auxiliary machines.

Further, the controller 6 controls the cathode compressor 25 and the like such that degrees of wetness (water contents) of each electrolyte membrane 111 and the catalyst layers 112A, 113A of the fuel cell 1 are in a state suitable for power generation. Although described in detail later, the controller 6 in the present embodiment has a function of calculating an ionomer resistance value particularly correlated with the degrees of wetness of the catalyst layers 112A, 113A.

Furthermore, the controller 6 in the present embodiment superimposes an alternating-current signal of a predetermined frequency on the outer current and the output voltage of the fuel cell 1 in measuring an impedance of the fuel cell 1.

This controller 6 calculates an impedance value Z of the fuel cell 1 at a predetermined frequency by dividing a voltage value obtained by applying a Fourier transform to a value obtained by superimposing the alternating-current signal of the predetermined frequency on the output voltage of the fuel cell 1 by a current value obtained by applying a Fourier transform to a value obtained by superimposing an alternating-current signal of the same frequency on the output current.

It should be noted that it is known that there is a relationship of $\omega = 2\pi f$ between a "frequency f" and an "angular frequency $\omega$", and there is only a difference multiplied by a dimensionless constant $2\pi$ between these. Thus, the "frequency" and the "angular frequency" are identified with each other and a symbol "$\omega$" is used in expressing the both to facilitate description below.

Figure 4:
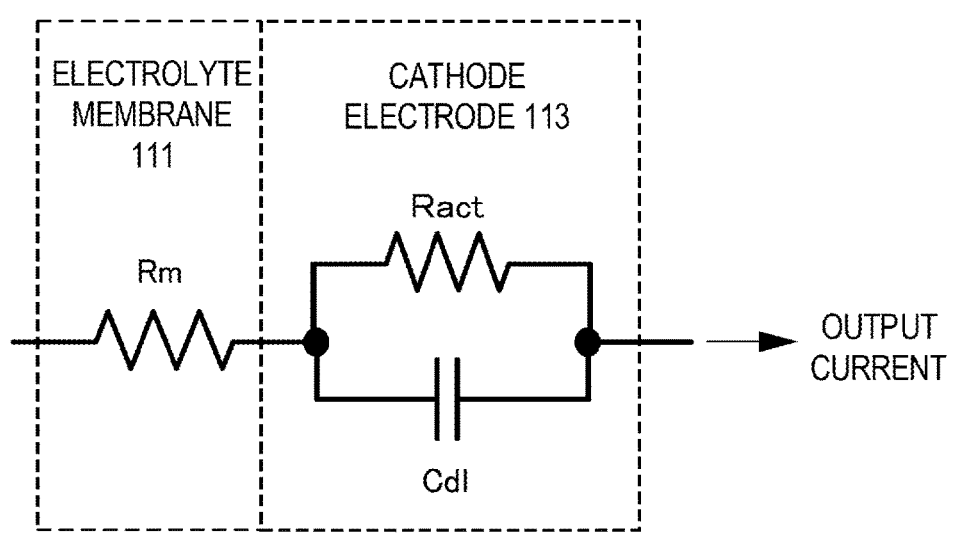
FIG. 4 is a diagram showing an equivalent circuit model of a unit cell of the fuel cell employed in the one embodiment of the present invention.

FIG. 4 is a diagram showing a simplified equivalent circuit of the unit cell of the fuel cell 10. This simplified equivalent circuit is a circuit designed to simplify a model by omitting circuit elements such as an electron transport resistance and a contact resistance in the actual fuel cell 1 and particularly considering only an electrolyte membrane resistance, a reaction resistance of the cathode electrode 113 and an electrical double layer capacitance as main circuit elements of the fuel cell 1.

Specifically, in the simplified equivalent circuit of this unit cell of the fuel cell 10, the influence of internal resistances generated due to a distribution in a thickness direction of the unit cell of the fuel cell 10 such as the ionomer resistance and the electron transport resistance is ignored.

Further, in this simplified equivalent circuit, the reaction resistance and the electrical double layer capacitance in the anode electrode 112 are ignored. The reason for that is that, since a reaction resistance value on the side of the anode electrode 112 is very small as compared to a reaction resistance value $R_{act}$ of the cathode electrode 113 when an anode gas concentration in the anode gas flow passages 121 is suitable for power generation, even if these are ignored, it is thought not to cause a large error in the state detection of the fuel cell 1.

Further, since the reaction resistance value on the side of the anode electrode 112 is very small as just described, a current easily flows into a reaction resistance part on the side of the anode electrode 112. Specifically, this means that almost no current flows into the electrical double layer capacitance component arranged in parallel to this reaction resistance. Thus, even if the electrical double layer capacitance component of the anode electrode 112 is ignored in impedance measurement, sufficient accuracy can be maintained.

Here, the impedance (written also as a simplified circuit impedance Z below) Z of the fuel cell 1 based on the equivalent circuit model of FIG. 4 is given by the following equation:

[Equation 1]

$$Z = R_m + \frac{R_{act}(1 - j\omega C_{dl} R_{act})}{1 + \omega^2 C_{dl}^2 R_{act}^2} \quad (1)$$

If a real part of this Equation (1) is taken and transformed, an electrolyte membrane resistance value $R_m$ is expressed as follows.

[Equation 2]

$$R_m = Z_{re} - \frac{R_{act}}{1 + \omega^2 C_{dl}^2 R_{act}^2} \quad (2)$$

Further, if an imaginary part of Equation (1) is taken, the following equation is obtained.

[Equation 3]

$$-\frac{1}{\omega Z_{im}} = \frac{1}{\omega^2 C_{dl} R_{act}^2} + C_{dl} \quad (3)$$

$Z_{re}$, $Z_{im}$ respectively mean the real part and the imaginary part of the impedance of the fuel cell 1, $\omega$ means the angular frequency of the alternating-current signal, $R_{act}$ means the reaction resistance value of the cathode electrode and $C_{dl}$ means the electrical double layer capacitance value of the cathode electrode 113.

Accordingly, two sets $(Z_{re1}, Z_{im1})$, $(Z_{re2}, Z_{im2})$ of the real part and the imaginary part of the impedance measurement value are obtained by measuring the impedance Z of the fuel cell 1 at two frequencies. Thus, the electrolyte membrane resistance value $R_m$ can be obtained by applying these to Equations (2) and (3).

Particularly, an impedance curve (hereinafter, also written as an equivalent circuit impedance curve) on a complex plane determined on the basis of Equation (1) expresses a circle on the complex plane having a center of $R_m+R_{act}/2$ and a radius of $R_{act}/2$. Thus, an intersection of this circle and a real axis is $R_m$. This means that a measurement value $Z_{re}(\omega_H)$ of a real part impedance matches the electrolyte membrane resistance value $R_m$ if a high frequency $\omega_H$ having a sufficiently large value is used also in impedance measurement. It should be noted that this is also clear from that the second term on the right side approaches 0 and $R_m \approx R_{re}$ if $\omega$ is set at a sufficiently large value in Equation (2).

However, in the simplified equivalent circuit of the fuel cell 1 shown in FIG. 4, the influence of the internal resistance values generated due to the distribution in the thickness direction of the fuel cell such as the ionomer resistance value, the electron transport resistance values in the electrolyte membrane 111, the gas diffusion layer 113 and the catalyst layer 113A (hereinafter, these are merely written as the electron transport resistance value of the electrolyte membrane 111) is ignored. Thus, the value of the electrolyte membrane resistance value $R_m$ calculated on the basis of the real part impedance measurement value $Z_{re}(\omega_H)$ at the high frequency $\omega_H$ of the sufficiently large value as described above was found not necessarily to match the value of a true electrolyte membrane resistance of the fuel cell 1.

The present inventors found out that the electrolyte membrane resistance value $R_m$ determined on the basis of the aforementioned simplified equivalent circuit was actually equivalent to a value obtained by adding the ionomer resistance component and the electron transport resistance component of the electrolyte membrane 111 to the true electrolyte membrane resistance value of the fuel cell 1 (hereinafter written as a supposed high-frequency impedance value $R_{cell,sup}$).

Accordingly, the electrolyte membrane resistance value $R_m$ determined on the basis of the simplified equivalent circuit was written as a supposed high-frequency impedance value $R_{cell,sup}$ and clearly distinguished from a symbol "$R_{mem}$" meaning the true electrolyte membrane resistance of the fuel cell 1. Specifically, the supposed high-frequency impedance value $R_{cell,sup}$ is equal to the sum of the true electrolyte membrane resistance value $R_{mem}$, an ionomer resistance value $R_{ion}$ and the electron transport resistance value of the electrolyte membrane 111.

To accurately estimate the true electrolyte membrane resistance value $R_{mem}$ of the fuel cell 1, the ionomer resistance value $R_{ion}$ and the electron transport resistance value of the electrolyte membrane 111 need to be excluded. Here, for example, the ionomer resistance value $R_{ion}$ is known to be a resistance generated due to movements of protons $H^+$ in the catalyst layer 113A and a distribution of Pt (reaction site) in a thickness direction of the catalyst layer 113A has to be considered to precisely detect the ionomer resistance value $R_{ion}$.

Figure 5:
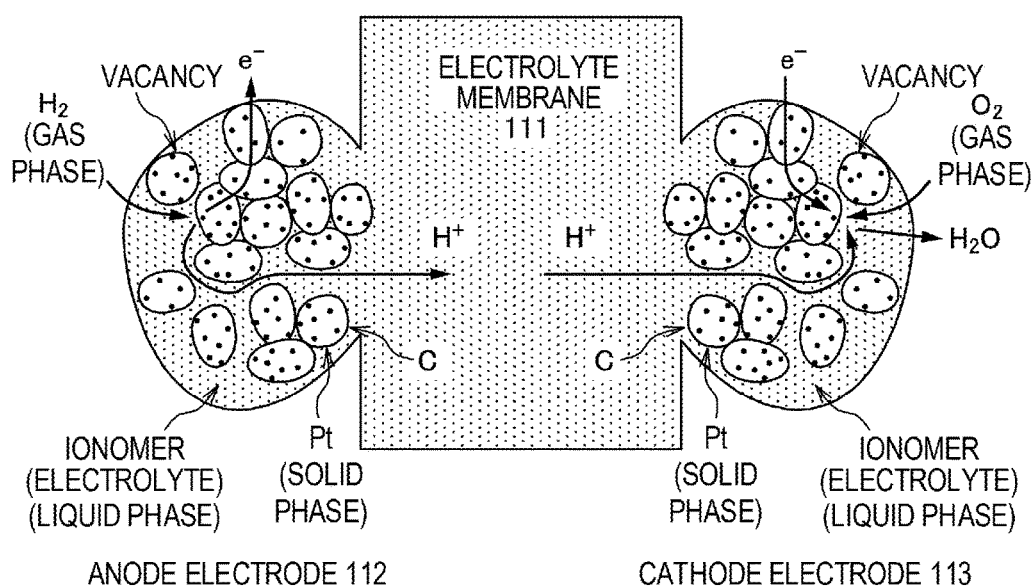
FIG. 5 is a diagram showing a principle of increasing an ionomer resistance value as a thickness of a catalyst layer of an electrolyte membrane increases.

FIG. 5 is a diagram showing a principle of increasing the ionomer resistance value as a thickness of the catalyst layer 113A of the electrolyte membrane 111 increases. As is understood with reference to FIG. 5, if reactions occur on Pt (platinum) distant from the electrolyte membrane 111, protons $H^+$ have to move a long distance in ionomers and reaction efficiency is reduced. On the other hand, if reactions are excessively concentrated on Pt close to the electrolyte membrane 111, it is thought that the protons $H^+$ and local oxygen fluxes increase, an energy loss increases and the reaction efficiency is reduced.

Since the reaction efficiency is reduced if the protons $H^+$ move a long distance in the ionomers or are concentrated on Pt close to the electrolyte membrane 111 as described above, the reactions tend to progress to have a uniform distribution of a certain level in the thickness direction so that such an efficiency reduction is not caused.

According to the above considerations, moving distances in the ionomers increase on the basis of the action of the protons $H^+$ exhibiting the distribution uniform in the thickness direction if the thickness of the catalyst layer 113A increases. Thus, the ionomer resistance value is understood to increase.

Figure 6:
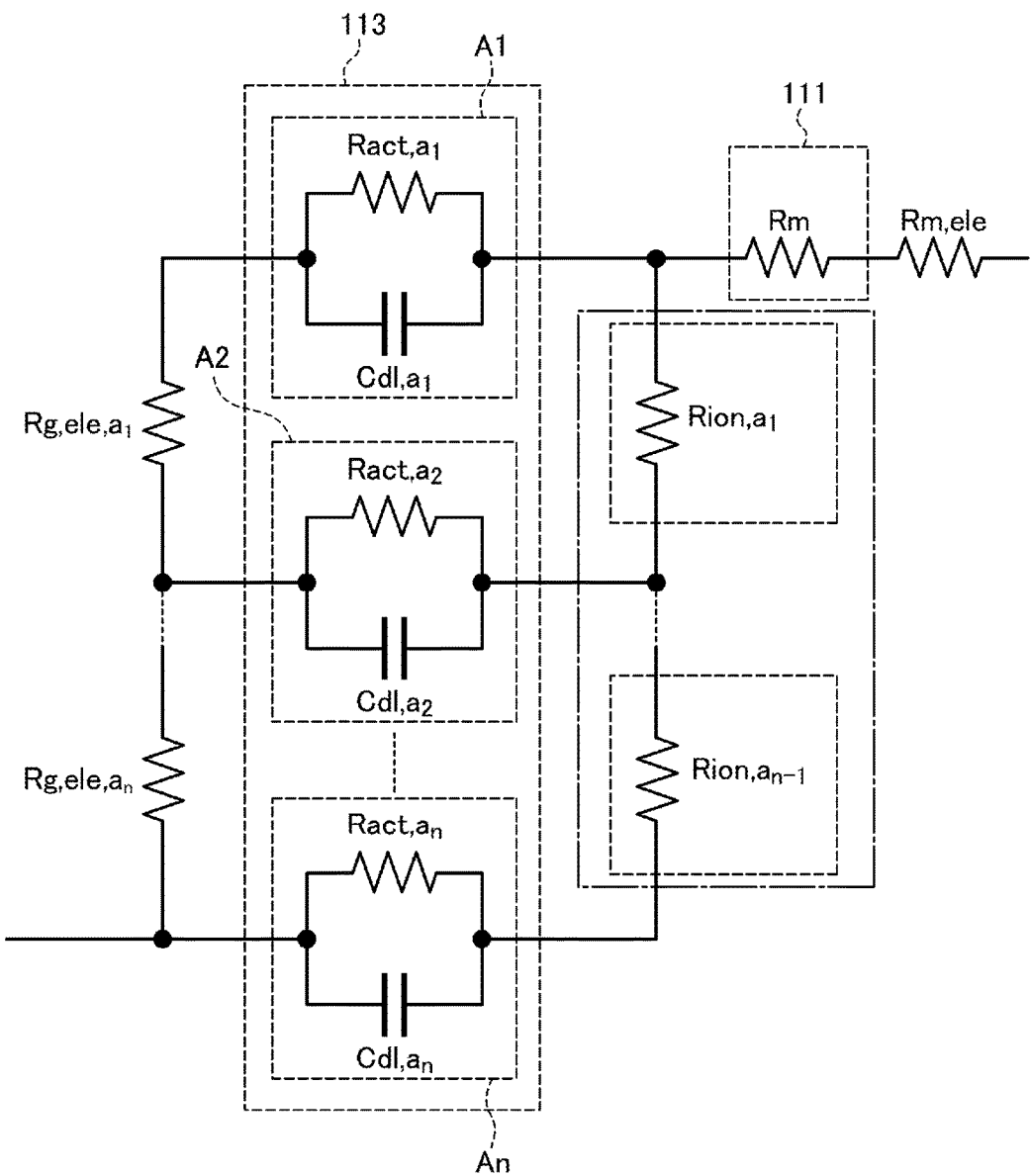
FIG. 6 shows an equivalent circuit of a distribution parameter system taking into account a distribution in a thickness direction of the unit cell of the fuel cell.

FIG. 6 shows an equivalent circuit of a distribution parameter system also taking into account the distribution in the thickness direction of the unit cell of the fuel cell 10. Specifically, this equivalent circuit is a circuit considering the influence of the ionomer resistance, the electron transport resistance of the electrolyte membrane 111 and the like and more accurately expressing actual characteristics of the unit cell of the fuel cell 10.

As shown in FIG. 6, in this equivalent circuit, reaction sites A1 to An each including a reaction resistance element and an electrical double layer capacitance element are set in the cathode electrode 113. Specifically, a plurality of reaction sites A1 to An are set in correspondence with the thickness of the cathode electrode 113 to make a model more accurate. Further, in this equivalent circuit, the ionomer resistance and the electron transport resistance of the electrolyte membrane 111 are also considered, the thickness of the unit cell of the fuel cell 10 is also considered similarly to the cathode electrode 113 and each is set as one of a plurality of resistance elements (n−1 resistance elements in FIG. 6).

It should be noted that the reaction resistance values corresponding to each reaction resistance element in the cathode electrode 113 are denoted by $R_{act,a1}$, $R_{act,a2}$, ..., $R_{act,an}$ and the electrical double layer capacitance values corresponding to the electrical double layer capacitance elements are denoted by $C_{dl,a1}$, $C_{dl,a2}$, ..., $C_{dl,an}$. Further, similarly, the ionomer resistance values are denoted by $R_{ion,a1}$, $R_{ion,a2}$, ..., $R_{ion,an}$ and the electron transport resistance value of the electrolyte membrane 111 is denoted by $R_{m,ele}$. It should be noted that $R_{g,ele,a1}$, $R_{g,ele,a2}$, ..., $R_{g,ele,an-1}$ in FIG. 6 mean electron transport resistance values due to a structure formed by carbon carrying Pt in the catalyst layer 113A.

Here, the impedance value in the electrical double layer capacitance element is generally known to be expressed by an equation of $1/(\omega C_{dl})$. Thus, as is clear from this equation, the impedance value in the electrical double layer capacitance element decreases as the frequency increases.

With this, if the reaction site A1 of the cathode electrode 113 relatively close to the electrolyte membrane 111 in FIG. 6 is focused, the value of an impedance (i.e. combined resistance of $R_{act,a1}$ and $C_{dl,a1}$) in the entire reaction site A1 is also reduced at a high frequency. Specifically, as a higher frequency is input, a current more easily flows into the reaction site A1 close to the electrolyte membrane 111. Further, a current flowing into the reaction site An distant from the electrolyte membrane 111 passes through all the ionomer resistance elements. Thus, as described above, the current is, conversely, difficult to flow into the reaction site An in the case of a high frequency at which the current relatively easily flows to the side of the reaction site A1.

Figure 7:
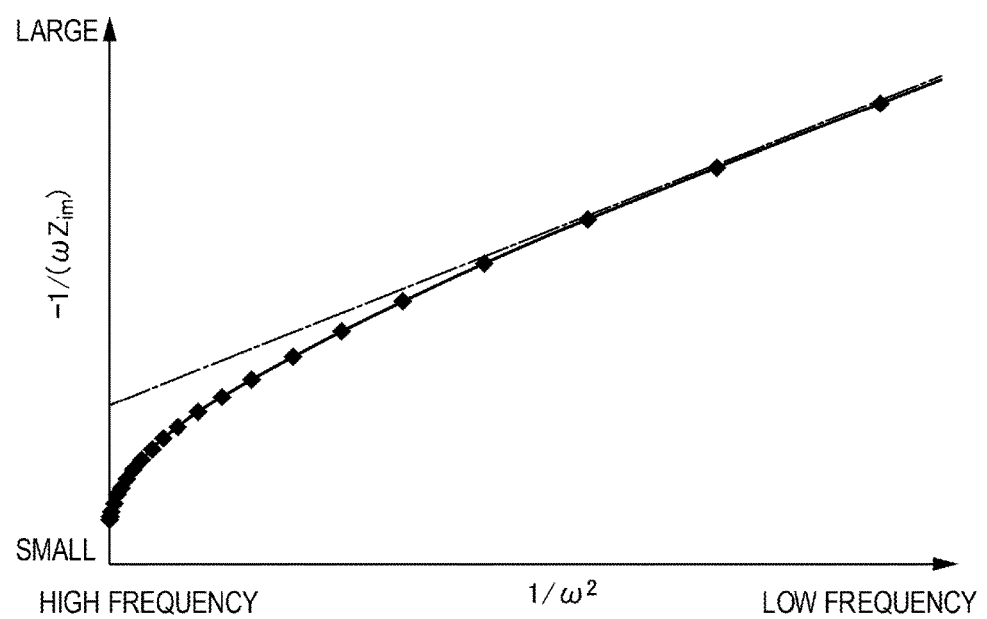
FIG. 7 is a graph showing a frequency characteristic of an imaginary impedance determined on the basis of a simplified equivalent circuit.

Here, FIG. 7 is a graph showing a frequency characteristic of an imaginary part impedance value determined on the basis of the simplified equivalent circuit of FIG. 4. Here, a straight line shown by broken line in FIG. 7 is a graphical representation of Equation (3) based on the aforementioned simplified equivalent circuit. Specifically, a gradient of this straight line is given by $1/C_{dl}R^2_{act}$ and an intercept is given by $C_{dl}$.

A curve shown in FIG. 7 is drawn by plotting and connecting the imaginary part impedance measurement values $Z_{im}(\omega)$ measured at a plurality of frequencies $\omega$ in advance in the fuel cell 1. Further, if the imaginary part impedance measurement values $Z_{im}(\omega)$ measured at a plurality of frequency points are used in this way, the electrical double layer capacitance value $C_{dl}$ and the reaction resistance value $R_{act}$ can be obtained on the basis of the imaginary part impedance $Z_{im}$ obtained from Equation (1) for the aforementioned simplified equivalent circuit. It should be noted that the gradient $1/C_{dl}R^2_{act}$ and the intercept $C_{dl}$ of the above straight line are also obtained using the electrical double layer capacitance value $C_{dl}$ and the reaction resistance value $R_{act}$ obtained in this way.

As shown in FIG. 7, a line connecting rectangular plot points matches the straight line based on the simplified equivalent circuit in a relatively low frequency region, but does not match in a high frequency region and the value rapidly decreases to widen a gap. This means, in fact, that the simplified equivalent circuit shown in FIG. 4 satisfactorily models the actual fuel cell in a relatively low frequency region, but does not satisfactorily model in a relatively high frequency region.

The present inventors think that the accuracy of the simplified equivalent circuit shown in FIG. 4 as a model is reduced in the relatively high frequency region because the influence of the electron transport resistance value $R_{m,ele}$ of the electrolyte membrane 111 and the ionomer resistance values $R_{ion,a1}$ to $R_{ion,an}$ considered in the equivalent circuit of the distribution parameter system in FIG. 6 increases to such an extent as not be negligible in the high frequency region. It should be noted that the electron transport resistance values $R_{g,ele,a1}, R_{g,ele,a2}, \ldots, R_{g,ele,an-1}$ due to carbon in the catalyst layer 113A are much smaller than the electron transport resistance value $R_{m,ele}$ of the electrolyte membrane 111 and the ionomer resistance values $R_{ion,a1}, R_{ion,a2}, \ldots, R_{ion,an}$. Thus, even if these electron transport resistance values $R_{g,ele,a1}, R_{g,ele,a2}, \ldots, R_{g,ele,an-1}$ are ignored, no large error is caused in the actual model, wherefore the electron transport resistance values $R_{g,ele,a1}, R_{g,ele,a2}, \ldots, R_{g,ele,an-1}$ are ignored in the present embodiment.

Figure 8:
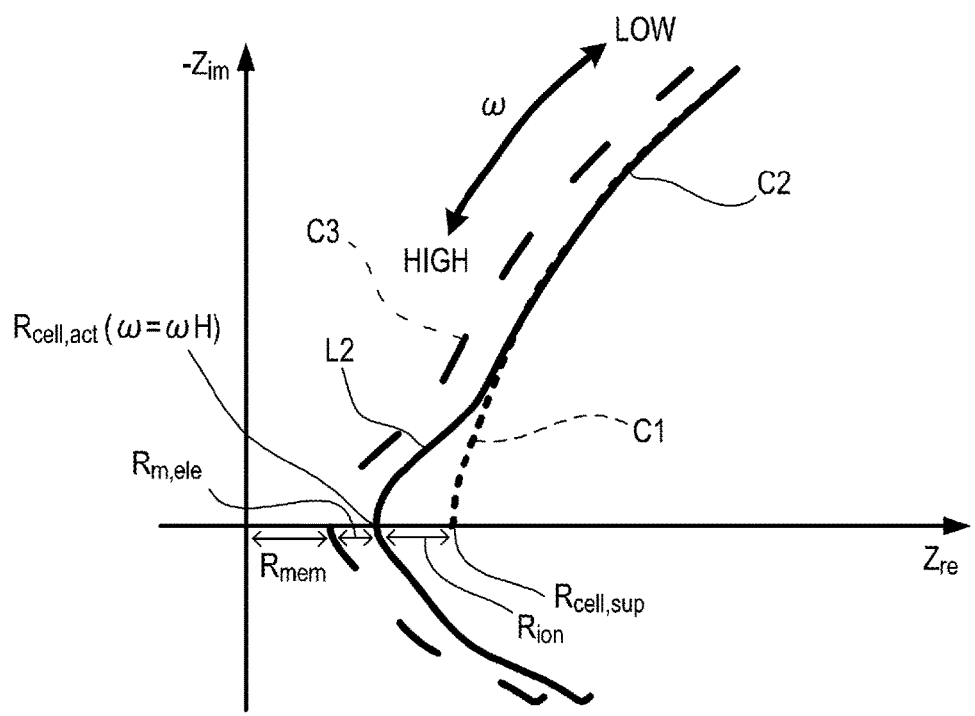
FIG. 8 is a Nyquist diagram of the fuel cell according to the one embodiment.

FIG. 8 shows an impedance curve determined by applying a measurement value of a state quantity of the fuel cell 1 to the simplified equivalent circuit (also written as an equivalent circuit impedance curve C1), an impedance curve based on an actual measurement value of the impedance measured under predetermined conditions in advance (also written as an actually measured impedance curve C2) and an impedance curve when it is supposed that the influence of the electron transport resistance value $R_{m,ele}$ of the electrolyte membrane 111 is excluded in the actually measured impedance curve (hereinafter, also written as an electron transport resistance excluded impedance curve C3).

It should be noted that, in FIG. 8, the equivalent circuit impedance curve C1 is shown by broken line, the actually measured impedance curve C2 is shown by solid line and the electron transport resistance excluded impedance curve C3 is shown by dashed-dotted line. Here, each impedance curve is shown only partly for drawing simplification.

The equivalent circuit impedance curve C1 is set by applying impedance measurement values at least at two points belonging to an arc region (low frequency region) to Equation (1) or Equations (2) and (3) for impedance obtained from the above simplified equivalent circuit.

Specifically, the equivalent circuit impedance curve C1 is an arc curve obtained, for example, by applying impedance measurement values $Z(\omega_{L1})$ and $Z(\omega_{L2})$ at two frequencies $\omega_{L1}$ and $\omega_{L2}$ in a low frequency region, particularly real parts $Z_{re}(\omega_{L1})$ and $Z_{re}(\omega_{L2})$ and imaginary parts $Z_{im}(\omega_{L1})$ and $Z_{im}(\omega_{L2})$ thereof to Equations (2) and (3) for impedance based on the simplified equivalent circuit, obtaining the electrical double layer capacitance $C_{dl}$, the reaction resistance $R_{act}$ and the supposed high-frequency impedance value $R_{cell,sup}$ from four equations thus obtained, and substituting these values into Equation (1). Specifically, as is particularly understood with reference to FIG. 8, the value of an intersection of the equivalent circuit impedance curve C1 and a real axis is equivalent to the supposed high-frequency impedance value $R_{cell,sup}$.

The actually measured impedance curve C2 is a curve obtained by plotting and drawing a plurality of impedance measurement values obtained by measuring the impedance at a plurality of frequencies on a complex plane for the fuel cell 1 for which the above equivalent circuit impedance curve C1 was obtained. It should be noted that since this actually measured impedance curve C2 normally requires the impedance measurement values at many frequencies, it is difficult to generate the actually measured impedance curve C2 in a state where the fuel cell 1 is installed in the vehicle. Thus, data generated by empirically measuring the impedance in advance for a fuel cell of the same type as the fuel cell 1 is, for example, used as this actually measured impedance curve C2.

The electron transport resistance excluded impedance curve C3 is a curve obtained by excluding the influence of the electron transport resistance value $R_{m,ele}$ from the actually measured impedance curve C2. The present inventors found out that the electron transport resistance excluded impedance curve C3 differed from the actually measured impedance curve C2 only by a parallel movement in a negative direction of the real axis by the influence of the electron transport resistance value $R_{m,ele}$. Specifically, the actually measured high-frequency impedance value $R_{cell,act}$, which is the value of an intersection of the actually measured impedance curve C2 and the real axis, is the sum of the electrolyte membrane resistance value $R_{mem}$ and the electron transport resistance value $R_{m,ele}$.

The actually measured impedance curve C2 substantially matches the above equivalent circuit impedance curve C in the arc region where the frequency is relatively low. However, the actually measured impedance curve C2 forms a straight line part and is deviated from the equivalent circuit impedance curve C1 in a non-arc region L2 where the frequency is relatively high.

Such a non-arc region L2 is formed because an error due to the influence of the ionomer resistance increases in the high-frequency region since the influence of the ionomer resistance based on the distribution in the thickness direction of the unit cell of the fuel cell is not considered in the equivalent circuit impedance curve C1 set on the basis of the simplified equivalent circuit as described above.

As a result of earnest study of the present inventors, it was found out from the above that the electron transport resistance value $R_{m,ele}$ of the electrolyte membrane 111 and the electrolyte membrane resistance value $R_{mem}$ were canceled out and the ionomer resistance values $R_{ion,a1}$ to $R_{ion,an}$ (hereinafter, these are also collectively written as $R_{ion}$) are obtained by taking a difference between the supposed high-frequency impedance value $R_{cell,sup}$, which was the value of the intersection of the equivalent circuit impedance curve C1 and the real axis, and the actually measured high-frequency impedance value $R_{cell,act}$, which was the value of the intersection of the actually measured impedance curve C2 and the real axis, on a part of the real axis where the frequency ω is largest. The ionomer resistance values $R_{ion}$ obtained in this way are highly accurate without including other resistance components.

Further, since the ionomer resistance values $R_{ion}$ are correlated with the wet/dry state of the fuel cell 1, such highly accurate ionomer resistance values $R_{ion}$ can be used for the estimation of the wet/dry state of the fuel cell 1 and the wet/dry state can be highly accurately estimated.

The estimation of the aforementioned ionomer resistance values $R_{ion}$ and the estimation of the wet/dry state on the basis of the estimated ionomer resistance values $R_{ion}$ are described in detail below.

(First Embodiment)

Figure 9:
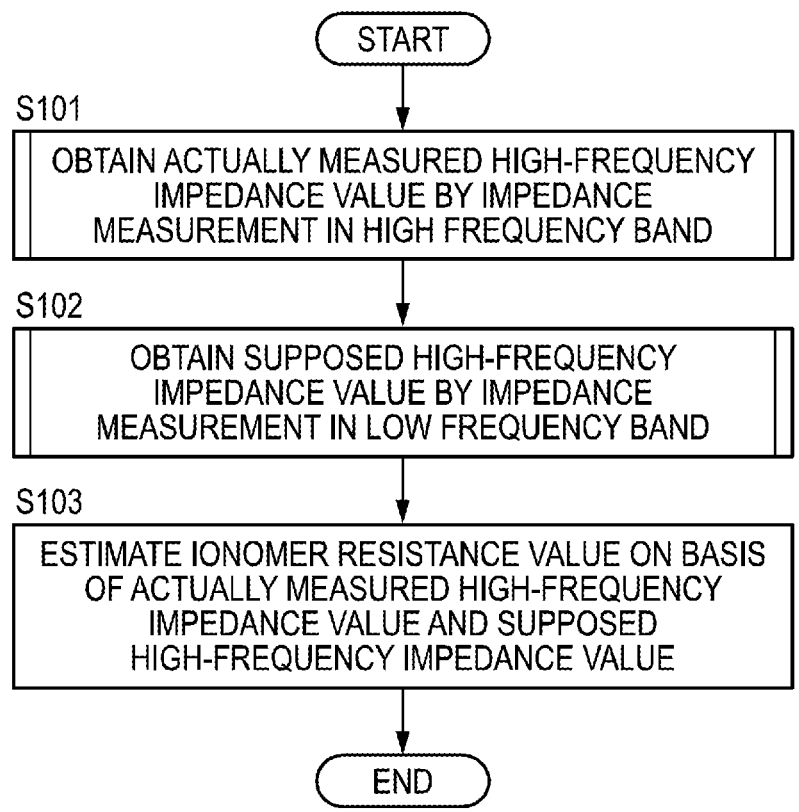
FIG. 9 is a flow chart showing the flow of estimating an ionomer resistance value of the fuel cell.

FIG. 9 is a flow chart showing the flow of estimating the ionomer resistance values $R_{ion}$ of the fuel cell 1 according to a first embodiment. It should be noted that Steps S101 to S103 below are performed by the controller 6.

As shown in FIG. 9, first in Step S101, the aforementioned actually measured high-frequency impedance value $R_{cell,act}$ is obtained using an impedance measurement value at a frequency in the non-arc region L2.

Figure 10:
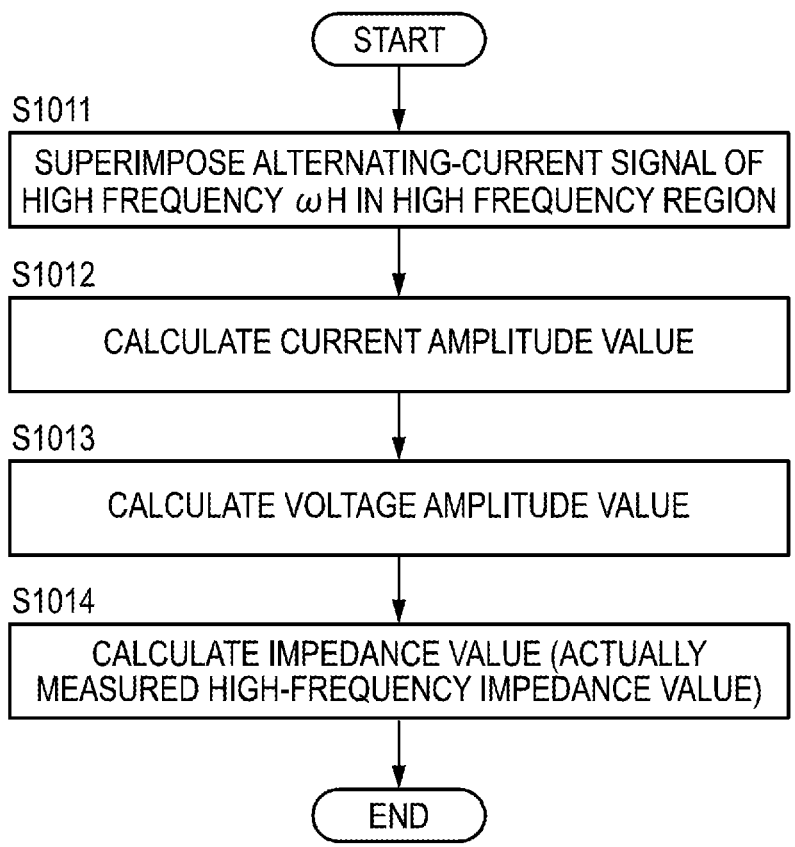
FIG. 10 is a flow chart showing the flow of obtaining an actually measured high-frequency impedance value.

FIG. 10 is a flow chart showing the detailed flow of obtaining this actually measured high-frequency impedance value $R_{cell,act}$. The actually measured high-frequency impedance value $R_{cell,act}$ according to the present embodiment is estimated in accordance with Steps S1011 to S1014 shown in FIG. 10.

First, in Step S1011, the controller 6 controls the DC/DC converter 56 to superimpose a signal of a frequency $\omega_H$ (several kHz to several tens of kHz) in the non-arc region L2 on an output current and an output voltage output from the fuel cell 1 at an impedance measurement timing.

It should be noted that the frequency $\omega_H$ more preferably has as large a value as possible and, hence, is preferably several tens of kHz. As the value of the frequency increases in this way, a point on a complex plane expressed by this frequency approaches the intersection of the actually measured impedance curve C2 and the real axis.

In Step S1012, the controller 6 applies a Fourier transform processing to a current value $I_{out}$ of the output current measured by the current sensor 51 to calculate a current amplitude value $I_{out}(\omega_H)$.

In Step S1013, the controller 6 applies a Fourier transform processing to an output voltage $V_{out}$ measured by the voltage sensor 52 to calculate a voltage amplitude value $V_{out}(\omega_H)$.

In Step S1014, an impedance curve $Z(\omega_H)$ is calculated by dividing the voltage amplitude value $V_{out}(\omega_H)$ by the current amplitude value $I_{out}(\omega_H)$ and a real component $Z_{re}(\omega_H)$ thereof is determined as the actually measured high-frequency impedance value $R_{cell,act}$ of the fuel cell 1.

Referring back to FIG. 9, in Step S102, the aforementioned supposed high-frequency impedance value $R_{cell,sup}$ is obtained using an impedance measurement value at a frequency in the arc region, which is a low frequency region.

It should be noted that, in the present embodiment, the actually measured impedance curve C2 substantially matches the equivalent circuit impedance curve C1 in the arc region as described above.

Figure 11:
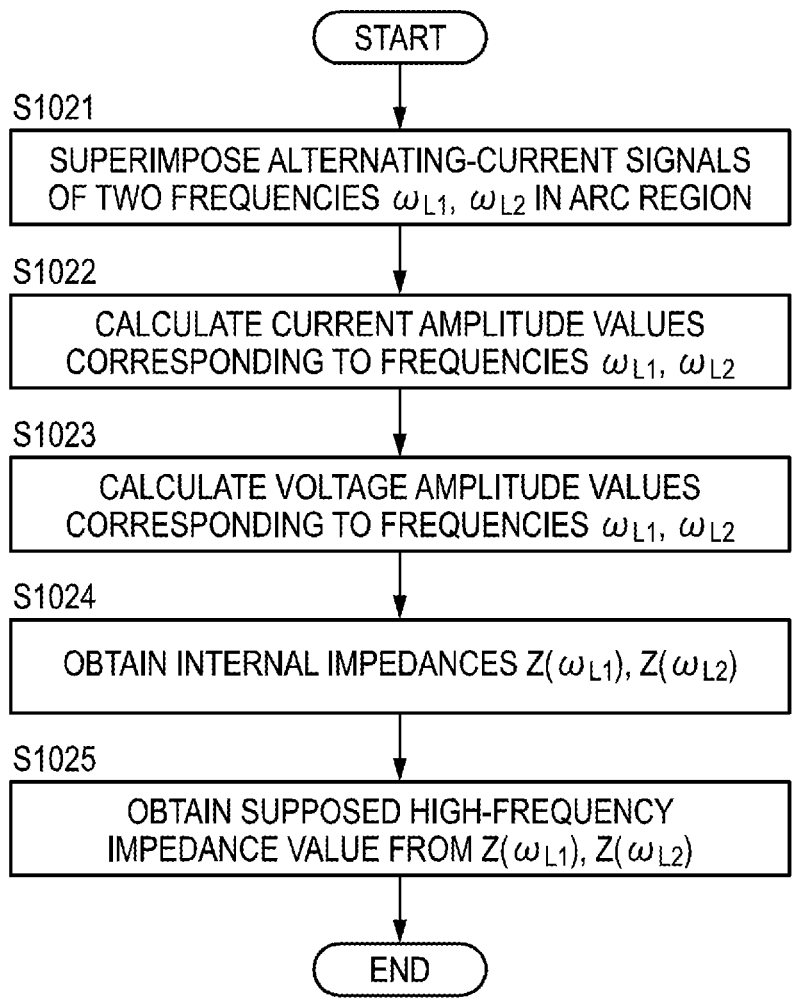
FIG. 11 is a flow chart showing the flow of obtaining a supposed high-frequency impedance value.

FIG. 11 is a flow chart showing the flow of obtaining this supposed high-frequency impedance value $R_{cell,sup}$. The supposed high-frequency impedance value is estimated in accordance with Steps S1021 to S1025 shown in FIG. 11.

First, in Step S1021, the controller 6 controls the DC/DC converter 56 to superimpose signals of two frequencies $\omega_{L1}$, $\omega_{L2}$ (several kHz to several tens of kHz) in the arc region on the output current and the output voltage output from the fuel cell 1 at an impedance measurement timing.

In Step S1022, the controller 6 applies a Fourier transform processing to the current value $I_{out}$ of the output current measured by the current sensor 51 to calculate a current amplitude value $I_{out}(\omega_{L1})$ in the case of superimposing the alternating-current signal of the frequency $\omega_{L1}$. Further, the controller 6 applies a Fourier transform processing to the current value $I_{out}$ of the output current measured by the current sensor 51 to calculate a current amplitude value $I_{out}(\omega_{L2})$ in the case of superimposing the alternating-current signal of the frequency $\omega_{L2}$.

In Step S1023, the controller 6 applies a Fourier transform processing to the value $V_{out}$ of the output voltage measured by the voltage sensor 52 to calculate a voltage amplitude value $V_{out}(\omega_{L1})$ in the case of superimposing the alternating-current signal of the frequency $\omega_{L1}$. Further, the controller 6 applies a Fourier transform processing to the value $V_{out}$ of the output voltage measured by the voltage sensor 52 to calculate a voltage amplitude value $V_{out}(\omega_{L2})$ in the case of superimposing the alternating-current signal of the frequency $\omega_{L2}$.

In Step S1024, an impedance value $Z(\omega_{L1})$ is calculated by dividing the voltage amplitude value $V_{out}(\omega_{L1})$ by the current amplitude value $I_{out}(\omega_{L1})$ and an impedance value $Z(\omega_{L2})$ is calculated by dividing the voltage amplitude value $V_{out}(\omega_{L2})$ by the current amplitude value $I_{out}(\omega_{L2})$.

In Step S1025, the supposed high-frequency impedance value $R_{cell,sup}$ is obtained on the basis of two impedances $Z(\omega_{L1})$, $Z(\omega_{L2})$. Specifically, equations obtained by applying the measured impedances $Z(\omega_{L1})$, $Z(\omega_{L2})$ to Equations (2) and (3) for impedance based on the simplified equivalent circuit are solved to obtain $R_{cell,sup}$ ($R_m$ in Equation (2)), which is one of unknowns.

First, based on Equation (3), a gradient is $(1/C_{dl}R_{act}^2)$ and an intercept is $C_{dl}$ on a coordinate plane with $(1/\omega^2)$ taken on a horizontal axis and $(-1/\omega Z_{im})$ taken on a vertical axis. Here, the electrical double layer capacitance $C_{dl}$ and the reaction resistance $R_{act}$ are calculated by applying imaginary number parts $Z_{im}(\omega_{L1})$ and $Z_{im}(\omega_{L2})$ of the aforementioned impedance measurement values $Z(\omega_{L1})$ and $Z(\omega_{L2})$ to Equation (3).

It should be noted that simultaneous quadratic equations for unknowns $C_{dl}$ and $R_{act}$ are obtained by applying two impedance imaginary number parts $Z_{im}(\omega_{L1})$ and $Z_{im}(\omega_{L2})$ to Equation (3) in this way. Thus, two solutions for each of the unknowns $C_{dl}$ and $R_{act}$, which are positive values, can be obtained. If combinations of these solutions are $(C_{dl-1}, R_{act-1})$ and $(C_{dl-2}, R_{act-2})$, candidates $R_{cell,sup-1}$, $R_{cell,sup-2}$ for the supposed high-frequency impedance value $R_{cell,sup}$ are obtained in correspondence with these combinations on the basis of Equation (2). Out of these, the proper one can be selected according to a situation.

In the present embodiment, it is particularly preferable to use $(R_{cell,sup-1}+R_{cell,sup-2})/2$, which is an average value of $R_{cell,sup-1}$ and $R_{cell,sup-2}$, as the supposed high-frequency impedance value $R_{cell,sup}$.

It should be noted that supposed high-frequency impedance value $R_{cell,sup}$ obtained as described above matches the value of the intersection of the equivalent circuit impedance curve C1 and the real axis (see FIG. 8).

Referring back to FIG. 9, in Step S103, the controller 6 estimates the ionomer resistance value $R_{ion}$ on the basis of the actually measured high-frequency impedance value $R_{cell,act}$ and the supposed high-frequency impedance value $R_{cell,sup}$. Specifically, the controller 6 estimates a value obtained by subtracting the actually measured high-frequency impedance value $R_{cell,act}$ from the supposed high-frequency impedance value $R_{cell,sup}$, i.e. $R_{cell,sup}-R_{cell,act}$, as the ionomer resistance value $R_{ion}$.

In the present embodiment, the ionomer resistance value $R_{ion}$ estimated in this way is used to estimate a degree of wetness w of the fuel cell 1.

Figure 12:
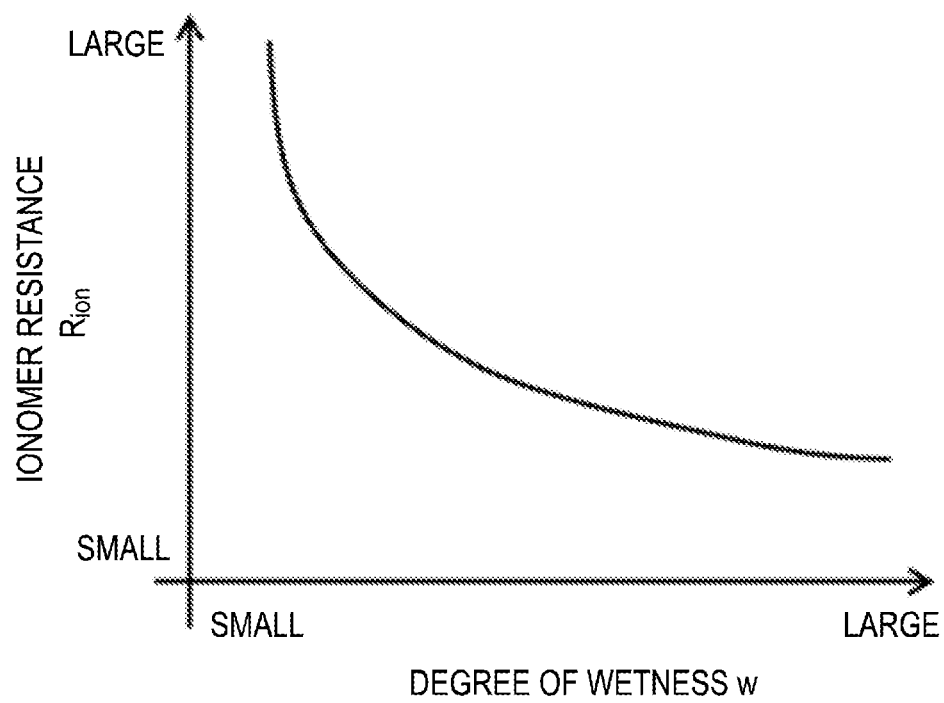
FIG. 12 is a graph showing a relationship between the ionomer resistance value and a degree of wetness.

FIG. 12 shows a relationship between the value of the ionomer resistance value $R_{ion}$ and the degree of wetness w of the fuel cell 1. As shown in FIG. 12, there is a negative correlation between the ionomer resistance value $R_{ion}$ and the degree of wetness w of the fuel cell 1. Specifically, the wet/dry state of the fuel cell 1 can be detected by monitoring the value of the ionomer resistance value $R_{ion}$.

According to the state detection device for the fuel cell 1 relating to the present embodiment described above, i.e. the state detection device composed of the controller 6, the current sensor 51, the voltage sensor 52 and the DC/DC converter 56, the following effects can be achieved.

In the state detection device for the fuel cell 1 relating to the present embodiment, the controller 6 functions as a supposed high-frequency impedance value setting unit configured to set the supposed high-frequency impedance value $R_{cell,sup}$ on the basis of the impedance measurement values $Z(\omega_{L1})$, $Z(\omega_{L2})$ belonging to the arc region of the impedance curve C2 of the fuel cell 1, an actually measured high-frequency impedance value calculation unit configured to obtain the actually measured high-frequency impedance value $R_{cell,act}$ on the basis of the impedance measurement value $Z(\omega_H)$ belonging to the non-arc region and an ionomer resistance estimation unit configured to estimate the value $R_{cell,sup}-R_{cell,act}$ obtained by subtracting the actually measured high-frequency impedance value $R_{cell,act}$ from the supposed high-frequency impedance value $R_{cell,sup}$ as the ionomer resistance value $R_{ion}$. The supposed high-frequency impedance value setting unit sets the value of the intersection of the equivalent circuit impedance curve C1 set on the basis of the impedance measurement values $Z(\omega_{L1})$, $Z(\omega_{L2})$ in the arc region and the real axis as the supposed high-frequency impedance value $R_{cell,sup}$ (Step S102 described above).

Here, for the equivalent circuit impedance curve C1 set on the basis of $Z(\omega_{L1})$, $Z(\omega_{L2})$ belonging to the arc region of the impedance curve C2 of the fuel cell 1, the supposed high-frequency impedance value $R_{cell,sup}$ determined as the value of the intersection of the equivalent circuit impedance curve C1 and the real axis includes the ionomer resistance value $R_{ion}$ in addition to the electrolyte membrane resistance value $R_{mem}$ and the electron transport resistance value $R_{m,ele}$ of the electrolyte membrane 111.

On the other hand, the actually measured high-frequency impedance value $R_{cell,act}$ set on the basis of the impedance measurement value $Z(\omega_H)$ belonging to the non-arc region of the impedance curve C2 of the fuel cell 1 includes the electrolyte membrane resistance value $R_{mem}$ and the electron transport resistance value $R_{m,ele}$ of the electrolyte membrane 111.

Accordingly, the electrolyte membrane resistance value $R_{mem}$ and the electron transport resistance value $R_{m,ele}$ are canceled out and the ionomer resistance value $R_{ion}$ can be obtained by subtracting the actually measured high-frequency impedance value $R_{cell,act}$ from the supposed high-frequency impedance value $R_{cell,sup}$. The highly accurate ionomer resistance value $R_{ion}$ obtained in this way can be used for the state detection of the fuel cell 1, which contributes to highly accurate state detection of the fuel cell 1 as a result.

Further, in the present embodiment, the equivalent circuit impedance curve C1 is particularly set by applying the impedance measurement values $Z(\omega_{L1})$, $Z(\omega_{L2})$ belonging to the arc region to Equations (1) to (3) for impedance obtained from the simplified equivalent circuit (see FIG. 4) of the fuel cell 1. By determining the equivalent circuit impedance curve C1 using the simplified equivalent circuit of the fuel cell 1 in this way, the amount of computation relating to the setting of the equivalent circuit impedance curve C1 is reduced. As a result, the amount of computation for obtaining the supposed high-frequency impedance value $R_{cell,sup}$, which is the value of the intersection of the equivalent circuit impedance curve C1 and the real axis, can be reduced.

Furthermore, in the present embodiment, the equivalent circuit impedance curve C1 is set by applying the real parts $Z_{re}(\omega_{L1})$, $Z_{re}(\omega_{L2})$ and the imaginary parts $Z_{im}(\omega_{L1})$, $Z_{im}(\omega_{L2})$ of the impedance measurement values $Z(\omega_{L1})$, $Z(\omega_{L2})$ at two frequencies $\omega_{L1}$, $\omega_{L2}$ in the arc region to Equation (2) for impedance real part and Equation (3) for impedance imaginary part obtained from the simplified equivalent circuit of FIG. 4.

By setting the equivalent circuit impedance curve C1 on the basis of Equation (2) for impedance real part and Equation (3) for impedance imaginary part based on the simplified equivalent circuit having the electrical double layer capacitance and the reaction resistance of the anode electrode 112 omitted in this way, the amount of computation for obtaining the supposed high-frequency impedance value $R_{cell,sup}$ can be more reduced.

Further, in the present embodiment, the supposed high-frequency impedance value setting unit obtains two or more candidates $R_{cell,sup-1}$, $R_{cell,sup-2}$ for the supposed high-frequency impedance value for each of two or more impedances $Z(\omega_{L1})$, $Z(\omega_{L2})$ belonging to the arc region based on the impedances $Z(\omega_{L1})$, $Z(\omega_{L2})$ and sets the average value $(R_{cell,sup-1}+R_{cell,sup-2})/2$ of the two or more candidates $R_{cell,sup-1}$, $R_{cell,sup-2}$ for the supposed high-frequency impedance value as the supposed high-frequency impedance value $R_{cell,sup}$. In this way, a measurement error of the supposed high-frequency impedance value $R_{cell,sup}$ is reduced.

Furthermore, in the present embodiment, $\omega_H$ is selected as the frequency in the non-arc region L2 and the impedance $Z(\omega_H)$ at this frequency $\omega_H$ is used in obtaining the actually measured high-frequency impedance value $R_{cell,act}$. However, without limitation to this, the actually measured high-frequency impedance value $R_{cell,act}$ may be calculated, for example, using impedances $Z(\omega_H')$, $Z(\omega_H'')$ at two frequencies $\omega_H'$, $\omega_H''$ lower than $\omega_H$ in the non-arc region. In this case, the actually measured high-frequency impedance value $R_{cell,act}$ can be calculated by a process similar to that of the calculation of the supposed high-frequency impedance value using Equations (1) to (3) for impedance obtained from the simplified equivalent circuit of FIG. 4.

Particularly, in this case, the actually measured high-frequency impedance value calculation means may obtain two or more candidates $R_{cell,act-1}$, $R_{cell,act-2}$ for the actually measured high-frequency impedance value on the basis of two or more impedances $Z(\omega_H')$, $Z(\omega_H'')$ belonging to the non-arc region L2 and estimate an average value $(R_{cell,act-1}+R_{cell,act-2})/2$ of these as the actually measured high-frequency impedance value $R_{cell,act}$. In this way, a measurement error of the actually measured high-frequency impedance value $R_{cell,act}$ is reduced.

On the other hand, a higher value out of the two or more candidates $R_{cell,sup-1}$, $R_{cell,sup-2}$ for the supposed high-frequency impedance value described above may be set as the supposed high-frequency impedance value $R_{cell,sup}$. Since the supposed high-frequency impedance value $R_{cell,sup}$ is estimated to be relatively high in this way, the value of the ionomer resistance value Ro estimated as $R_{cell,sup}$–$R_{cell,sup}$ is also estimated to be relatively high. Thus, with reference to the relationship shown in the graph of FIG. 12, the degree of wetness w is estimated to be relatively low. Therefore, a dry state of the fuel cell can be quickly grasped and measures to prevent over-drying can be taken.

Furthermore, in the case of obtaining two or more candidates $R_{cell,sup-1}$, $R_{cell,sup-2}$ for the actually measured high-frequency impedance value for each of two or more impedances $Z(\omega_H')$, $Z(\omega_H'')$ belonging to the non-arc region on the basis of the impedances $Z(\omega_H')$, $Z(\omega_H'')$ as described above, a lower value out of the obtained two or more candidates $R_{cell,sup-1}$, $R_{cell,sup-2}$ for the actually measured high-frequency impedance value may be estimated as the actually measured high-frequency impedance value $R_{cell,act}$.

Since the actually measured impedance value $R_{cell,act}$ is estimated to be relatively low in this way, the value of the ionomer resistance value $R_{ion}$ estimated as $R_{cell,sup}$–$R_{cell,act}$ is estimated to be higher. Thus, with reference to the relationship shown in the graph of FIG. 12, the degree of wetness w is estimated to be relatively low. Therefore, a dry state of the fuel cell 1 can be quickly grasped and measures to prevent over-drying can be taken.

On the other hand, a lower value out of the two or more candidates ($R_{cell,sup-1}$, $R_{cell,sup-2}$) for the supposed high-frequency impedance value described above may be set as the supposed high-frequency impedance value $R_{cell,sup}$. Since the supported high-frequency impedance value $R_{cell,sup}$ is estimated to be relatively low in this way, the value of the ionomer resistance value $R_{ion}$ estimated as $R_{cell,sup}$–$R_{cell,act}$ is also estimated to be relatively low. Thus, with reference to the relationship shown in the graph of FIG. 12, the degree of wetness w is estimated to be relatively high. Therefore, the wet state of the fuel cell can be quickly grasped and measures to prevent flooding or the like can be taken.

Further, as described above, in the case of obtaining two or more candidates ($R_{cell,act-1}$, $R_{cell,act-2}$) for the actually measured high-frequency impedance value for each of two or more impedances $Z(\omega_H')$, $Z(\omega_H'')$ belonging to the non-arc region based on the two or more impedances $Z(\omega_H')$, $Z(\omega_H'')$, a higher value out of the obtained two or more candidates ($R_{cell,act-1}$, $R_{cell,act-2}$) for the actually measured high-frequency impedance value may be estimated as the actually measured high-frequency impedance value $R_{cell,act}$.

Since the actually measured high-frequency impedance value $R_{cell,act}$ is estimated to be relatively high in this way, the value of the ionomer resistance value $R_{ion}$ estimated as $R_{cell,sup}$–$R_{cell,act}$ is estimated to be lower. Thus, with reference to the relationship shown in the graph of FIG. 12, the degree of wetness w is estimated to be relatively high. Therefore, the wet state of the fuel cell can be quickly grasped and measures to prevent flooding or the like can be taken.

It should be noted that, as described above, the higher value out of the candidates $R_{cell,sup-1}$, $R_{cell,sup-2}$ for the supposed high-frequency impedance value is selected (select high) and, on the other hand, the lower value out of the candidates $R_{cell,act-1}$, $R_{cell,act-2}$ for the actually measured high-frequency impedance value is selected (select low) in order to prevent over-drying. However, in terms of preventing flooding, select low for the supposed high-frequency impedance value and select high for the actually measured high-frequency impedance value are necessary.

Accordingly, it is preferable to make judgment on the select low and the select high while roughly judging whether the fuel cell 1 is in a state close to over-drying or in a state close to flooding (i.e. over-wetting).

In view of such a situation, the wet/dry state of the fuel cell 1 may be roughly estimated, for example, by the existing HFR measurement or the like and judgment on the select low and the select high may be made on the basis of the result of this rough estimation. Further, the wet/dry state may be roughly estimated on the basis of operating conditions of the fuel cell 1 such as a cathode gas flow rate, an anode gas flow rate and a temperature, and judgment on the select low and the select high may be made on the basis of the result of this rough estimation.

(Second Embodiment)

A second embodiment is described below. It should be noted that the same elements as in the first embodiment are denoted by the same reference signs and not described. In the present embodiment, an estimated ionomer resistance value $R_{ion}$ is corrected particularly in consideration of a deteriorated state of a fuel cell 1.

As a background for making such a correction, an estimated value of the ionomer resistance value $R_{ion}$ increases as a catalyst layer 113A is deteriorated. Specifically, since there is originally the negative correlation between the ionomer resistance value $R_{ion}$ and the degree of wetness w shown in FIG. 12, if the ionomer resistance value $R_{ion}$ can be estimated, the degree of wetness w can also be estimated on the basis of this estimated value. However, if the catalyst layer 113A is deteriorated, the ionomer resistance value $R_{ion}$ may increase regardless of the value of the degree of wetness w.

Accordingly, in the present embodiment, a correction is made to exclude an increase of the ionomer resistance value $R_{ion}$ due to the deterioration of the catalyst layer 113A so that the ionomer resistance value $R_{ion}$ accurately corresponds to the degree of wetness w.

Figure 13:
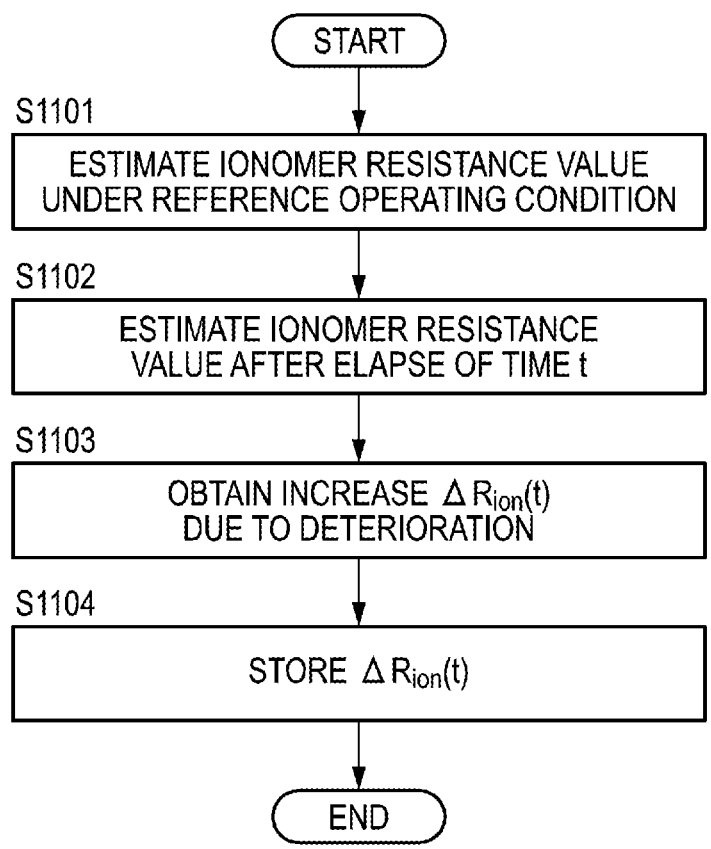
FIG. 13 is a flow chart showing the flow of generating data for ionomer resistance value correction.

FIG. 13 is a flow chart showing the flow of generating data for ionomer resistance value correction in the present embodiment. It should be noted that the data for ionomer resistance value correction is generated before the fuel cell 1 is installed in a vehicle.

Figure 14:
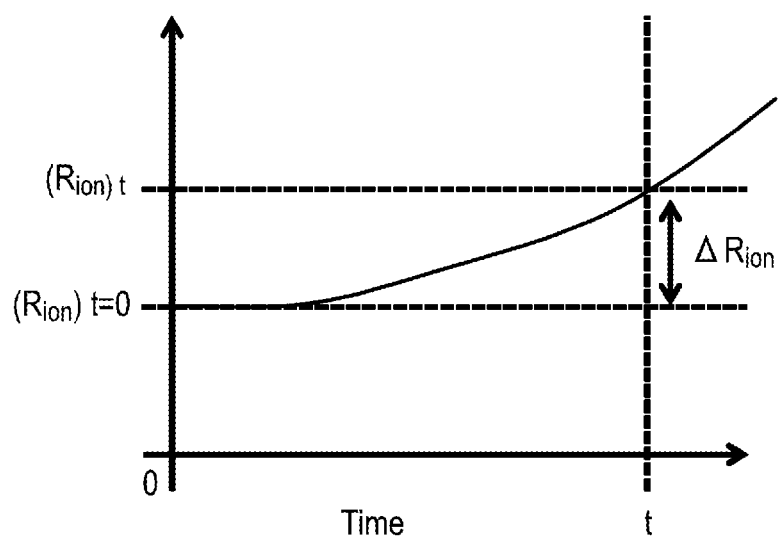
FIG. 14 is a graph diagrammatically showing an increasing state of the ionomer resistance value due to the deterioration of a catalyst layer.

Further, FIG. 14 is a graph diagrammatically showing a changing state of the ionomer resistance value $R_{ion}$ over time.

In Step S1101, a controller 6 estimates the ionomer resistance value under a reference operating condition. Here, the ionomer resistance value under the reference operating condition is a reference ionomer resistance value $(R_{ion})_{t=0}$ at time t=0 shown in FIG. 14, i.e. an ionomer resistance value estimated by the method composed of Steps S101 to S103 described above before deterioration of the catalyst layer 113A is generated such as during first operation of the fuel cell 1.

Further, the "reference operating condition" is a power generating condition of the fuel cell 1 supposing not a high load state such as during acceleration, but a normal load state such as during normal running or a low load state such as during inertial running. Particularly, this reference operating condition can be realized by controlling to open and close a cathode pressure control valve 28 and an anode pressure control valve 33 to adjust the supply amounts of anode gas and cathode gas or by controlling an output voltage of the fuel cell 1 by a DC/DC converter 56.

In Step S1102, the controller 6 estimates the ionomer resistance value $R_{ion}$ after the fuel cell 1 is actuated and a time t elapses following the estimation of the above reference ionomer resistance value $(R_{ion})_{t=0}$. Since the deterioration of the controller 113A progresses as the fuel cell 1 is operated after the estimation of the reference ionomer resistance value $(R_{ion})_{t=0}$, the ionomer resistance value $R_{ion}$ increases (see FIG. 14). Here, the increased ionomer resistance value $R_{ion}$ at time t is estimated. This ionomer resistance value $R_{ion}$ estimated at time t is also written as a "post-deterioration ionomer resistance value $(R_{ion})_t$" below.

In Step S1103, the controller 6 obtains an increase $\Delta R_{ion}(t)$ due to deterioration by subtracting the reference ionomer resistance value $(R_{ion})_{t=0}$ from the estimated post-deterioration ionomer resistance value $(R_{ion})_t$. It should be noted that, in the present embodiment, Steps S1102 and S1103 described above are performed with time and this increase $\Delta R_{ion}(t)$ is obtained as a function of time.

In Step S1104, the obtained $\Delta R_{ion}(t)$ is stored in an unillustrated memory or the like of the controller 6.

Thereafter, this increase $\Delta R_{ion}(t)$ is used as the data for ionomer resistance value correction. Specifically, for example, after the fuel cell 1 newly installed in the vehicle is operated for a while, the ionomer resistance value $R_{ion}$ is corrected using the stored increase $\Delta R_{ion}(t)$ as the correction data without computing an increase of the ionomer resistance value $R_{ion}$ due to deterioration. The correction of the ionomer resistance value using this data for ionomer resistance value correction is described in detail below.

Figure 15:
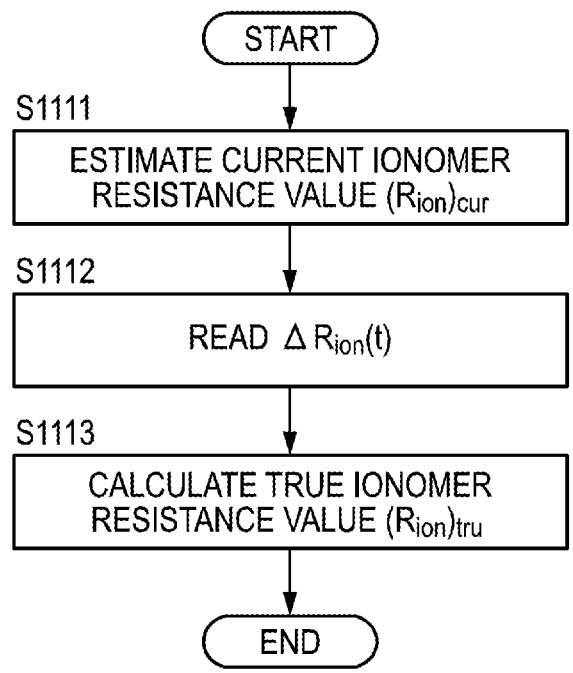
FIG. 15 is a flow chart showing the flow of correcting the ionomer resistance value.

FIG. 15 is a flow chart showing the flow of correcting the ionomer resistance value.

In Step S1111, the controller 6 estimates the ionomer resistance value $R_{ion}$ after the elapse of the predetermined time t following the actuation of the fuel cell 1. This estimated value is also written as a "current ionomer resistance value $(R_{ion})_{cur}$" below. It should be noted that this current ionomer resistance value $(R_{ion})_{cur}$ is also estimated by a method similar to the above Steps S101 to S103 shown in FIG. 9. Further, in the present embodiment, the operation time t of the fuel cell 1 when the current ionomer resistance value $(R_{ion})_{cur}$ was estimated is stored in the unillustrated memory or the like.

In Step S1112, the increase $\Delta R_{ion}(t)$ stored in Step S1204 described above is read from the memory or the like of the controller 6. Particularly, in the present embodiment, the increase $\Delta R_{ion}(t)$ corresponding to the operation time t of the fuel cell 1 is read from the memory or the like of the controller 6.

In Step S1113, a corrected true ionomer resistance value $(R_{ion})_{tru}$ is calculated by subtracting the increase $\Delta R_{ion}(t)$ from the current ionomer resistance value $(R_{ion})_{cur}$.

Accordingly, even if an influence due to the deterioration of the catalyst layer 113A is included in the current ionomer resistance value $(R_{ion})_{cur}$ after the elapse of the operation time t of the fuel cell 1, the true ionomer resistance value $(R_{ion})_{tru}$ including no influence due to the deterioration of the catalyst layer 113A is calculated by subtracting the increase $\Delta R_{ion}(t)$ from this current ionomer resistance value $(R_{ion})_{cur}$.

According to the state detection device for fuel cell relating to the present embodiment described above, the following effects can be achieved.

According to the present embodiment, the controller 6 further functions as ionomer resistance value correction means. This ionomer resistance value correction means obtains the increase $\Delta R_{ion}(t)$ of the ionomer resistance value by comparing the reference ionomer resistance value $(R_{ion})_{t=0}$ estimated under the reference operating condition and the post-deterioration ionomer resistance value $(R_{ion})_t$ estimated after the operation of the fuel cell 1 for a predetermined time following the estimation under this reference operating condition, and makes a correction to obtain the true ionomer resistance value $(R_{ion})_{tru}$ by subtracting this increase $\Delta R_{ion}(t)$ from the current estimated value $(R_{ion})_{cur}$ of the ionomer resistance value.

In this way, the value of the true ionomer resistance value $(R_{ion})_{tru}$ truly corresponding to the degree of wetness w can be obtained with high accuracy by excluding an increase of the ionomer resistance value $R_{ion}$ due to deterioration, with the result that accuracy in estimating the wet/dry state of the fuel cell 1 can be more improved.

Particularly, since the deteriorated state of the above fuel cell 1 is the deteriorated state of the catalyst layer 113A in the present embodiment, the influence of the deteriorated state of the catalyst layer 113A, which encourages an increase of the ionomer resistance value $R_{ion}$, can be reliably removed by the above correction.

It should be noted that although the deteriorated state of the catalyst layer 113A is particularly assumed as the deteriorated state of the fuel cell 1 in the present embodiment, there is no limitation to this. For example, a deteriorated state of another component causing an electron transport resistance such as a gas diffusion layer or a separator may be assumed. In this case, the value of the above electron transport resistance may be evaluated, an increase of the ionomer resistance value $R_{ion}$ may be estimated considering this evaluation result, and the true ionomer resistance value $(R_{ion})_{tru}$ may be obtained by subtracting this increase of the ionomer resistance value $R_{ion}$ from the estimated ionomer resistance value $(R_{ion})_{cur}$.

(Third Embodiment)

A third embodiment is described below. It should be noted that the same elements as in the first or second embodiment are denoted by the same reference signs and not described. In the present embodiment, an estimated electrolyte membrane resistance value $R_{mem}$ is corrected in consideration of an increase of the electrolyte membrane resistance value $R_{mem}$ due to the deterioration of an element largely contributing to an electron resistance such as a gas diffusion layer 113B or a separator 13 of a fuel cell 1.

Figure 16:
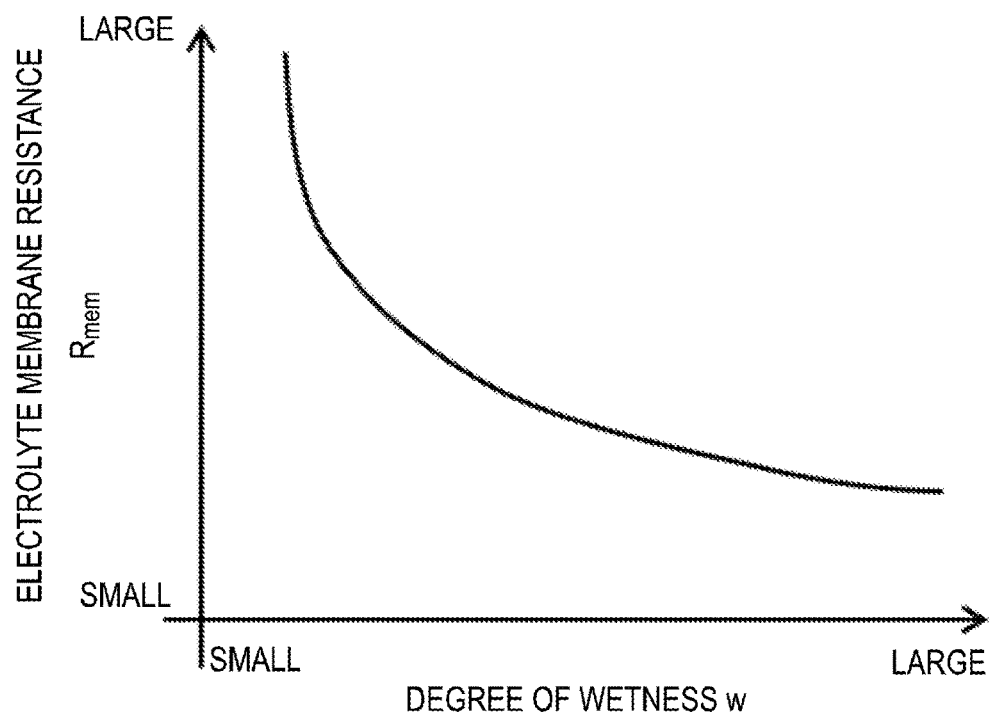
FIG. 16 is a graph showing a relationship between an electrolyte membrane resistance value and the degree of wetness.

FIG. 16 shows a relationship between the electrolyte membrane resistance value $R_{mem}$ and a degree of wetness w. As shown in FIG. 16, the relationship between the electrolyte membrane resistance value $R_{mem}$ and the degree of wetness w is in a negative correlation. Thus, if the degree of wetness w can be estimated using the ionomer resistance value $R_{ion}$ as described above, the electrolyte membrane resistance value $R_{mem}$ can be estimated on the basis of this estimated value of the degree of wetness w.

On the other hand, the actually measured high-frequency impedance value $R_{cell,act}$ obtained by Steps S1011 to S1014 of FIG. 10 is normally employed as the electrolyte membrane resistance value $R_{mem}$ used in various controls of the fuel cell 1. However, since the actually measured high-frequency impedance value $R_{cell,act}$ includes an electron transport resistance component as already described, this value increases if the element such as the gas diffusion layer 113B or the separator 13 is deteriorated.

In view of such a situation, in the present embodiment, a correction is made to exclude an increase of the electron transport resistance due to deterioration from the actually measured high-frequency impedance value $R_{cell,act}$ using the electrolyte membrane resistance value $R_{mem}$ estimated using the degree of wetness w based on the aforementioned ionomer resistance value $R_{ion}$.

Figure 17:
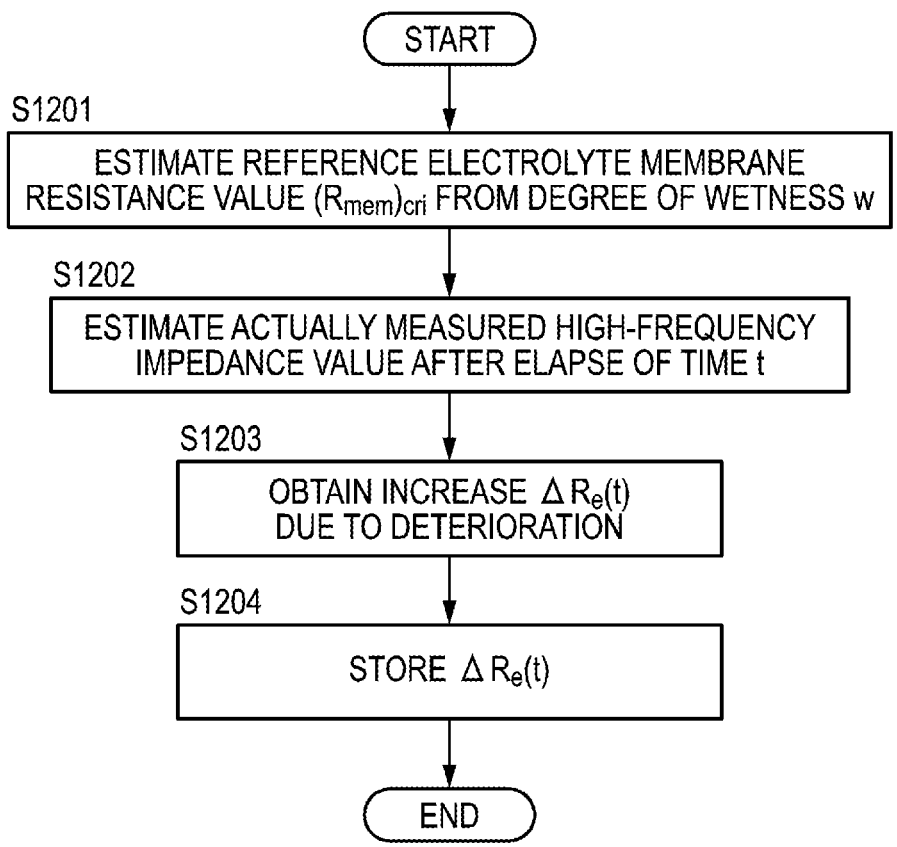
FIG. 17 is a flow chart showing the flow of generating data for electrolyte membrane resistance value correction.

FIG. 17 is a flow chart showing the flow of generating data for electrolyte membrane resistance value correction in the present embodiment. It should be noted that the data for electrolyte membrane resistance value correction is generated, for example, before the fuel cell 1 is installed in a vehicle. Each estimation and each measurement are preferably made under the reference operating condition described in the above second embodiment.

Figure 18:
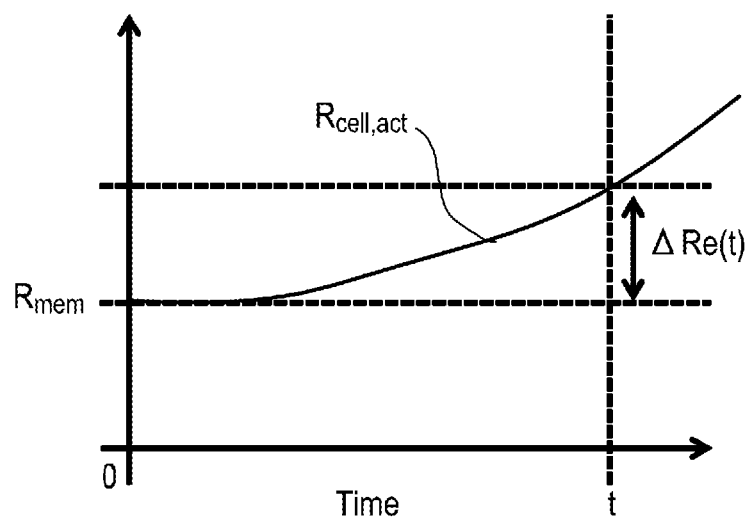
FIG. 18 is a graph diagrammatically showing an increasing state of the actually measured high-frequency impedance value due to the deterioration of a separator or the like, FIG. 19 is a flow chart showing the flow of correcting the electrolyte membrane resistance value.

Further, FIG. 18 is a graph diagrammatically showing a changing state of the actually measured high-frequency impedance value $R_{cell,act}$ over time.

In Step S1201, when the operation of the fuel cell 1 is started, a controller 6 estimates the electrolyte membrane resistance value $R_{mem}$ on the basis of the relationship between the electrolyte membrane resistance value and the degree of wetness w of the fuel cell 1 shown in FIG. 16 from the degree of wetness w estimated on the basis of the ionomer resistance value $R_{ion}$. It should be noted that the ionomer resistance value $R_{ion}$ used for estimation may be the value estimated in Step S103 of FIG. 9 or the true ionomer resistance value $(R_{ion})_{tru}$ obtained in Step S1113 of FIG. 15. Further, the electrolyte membrane resistance value $R_{mem}$ estimated in this way is set as a reference electrolyte membrane resistance value $(R_{mem})_{cri}$.

In Step S1202, the controller 6 obtains the actually measured high-frequency impedance value $R_{cell,act}$ after the fuel cell 1 is actuated and a time t elapses following the estimation of the reference electrolyte membrane resistance value $(R_{mem})_{cri}$. Since the deterioration of the element such as the gas diffusion layer 113B or the separator 13 progresses as the fuel cell 1 is operated after the estimation of the reference electrolyte membrane resistance value $(R_{mem})_{cri}$, the actually measured high-frequency impedance value $R_{cell,act}$ increases (see FIG. 18). Here, the increased actually measured high-frequency impedance value $R_{cell,act}$ at this time t is estimated. This actually measured high-frequency impedance value $R_{cell,act}$ estimated at time t is also written as a "post-deterioration actually measured impedance value $(R_{cell,act})_t$". It should be noted that a specific method for obtaining the actually measured high-frequency impedance value $R_{cell,act}$ is the same as the method described in Steps S1011 to S1014 of FIG. 10.

In Step S1203, the controller 6 obtains a difference $\Delta R_e(t)$ due to deterioration by subtracting the reference electrolyte membrane resistance value $(R_{mem})_{cri}$ from the estimated post-deterioration actually measured impedance value $(R_{cell,act})_t$. It should be noted that, in the present embodiment, Steps S1202 and S1203 described above are performed with time and this difference $\Delta R_e(t)$ is obtained as a function of time.

In Step S1204, the obtained $\Delta R_e(t)$ is stored in an unillustrated memory or the like of the controller 6.

Thereafter, this difference $\Delta R_e(t)$ is used as the data for electrolyte membrane resistance value correction. Specifically, for example, after the fuel cell 1 newly installed in the vehicle is operated for a while, $\Delta R_e(t)$ is corrected using the stored difference $\Delta R_e(t)$ as the correction data without computing an increase of the actually measured high-frequency impedance value $R_{cell,act}$ due to deterioration. The correction of the electrolyte membrane resistance value (actually measured high-frequency impedance value) using this correction data is described in detail below.

Figure 19:
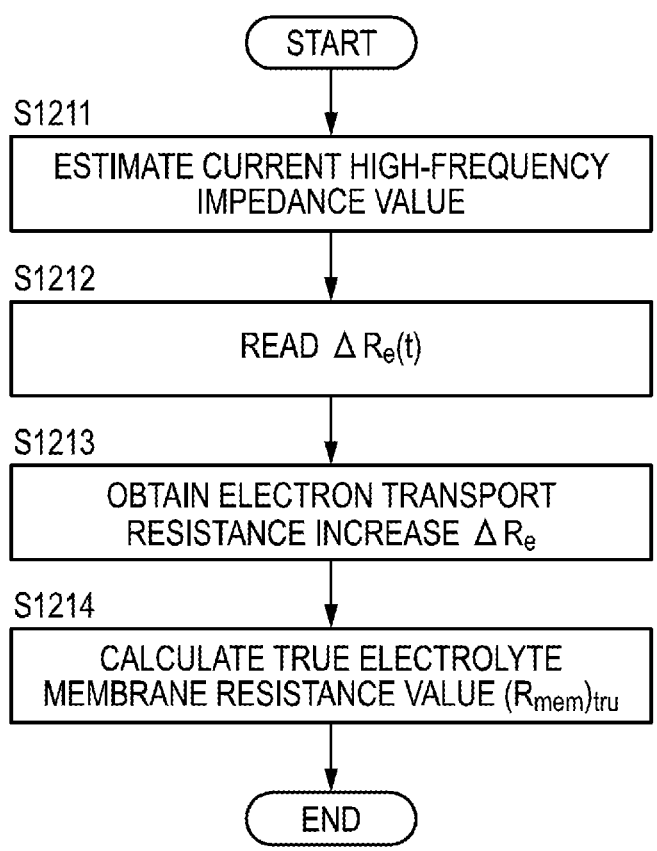

FIG. 19 is a flow chart showing the flow of correcting the electrolyte membrane resistance value.

In Step S1211, the controller 6 obtains the actually measured high-frequency impedance value $R_{cell,act}$ after the fuel cell 1 is operated for a predetermined time t. This obtained value is also written as a "current high-frequency impedance value $(R_{cell,act})_{cur}$" below.

It should be noted that the operation time t of the fuel cell 1 when the current high-frequency impedance value $(R_{cell,act})_{cur}$ was estimated is stored in the unillustrated memory or the like.

In Steps S1212 and S1213, the controller 6 reads the difference $\Delta R_e(t)$ stored in Step S1204 described above from the memory or the like thereof. Particularly, in the present embodiment, the difference $\Delta R_e(t)$ corresponding to the operation time t of the fuel cell 1 is read from the memory or the like of the controller 6.

In Step S1214, the controller 6 calculates a corrected true electrolyte membrane resistance value $(R_{mem})_{tru}$ by subtracting the difference $\Delta R_e(t)$ from the aforementioned current high-frequency impedance value $(R_{cell,act})_{cur}$.

Accordingly, even if an influence due to the deterioration of the element such as the gas diffusion layer 113B or the separator 13 is included in the current high-frequency impedance value $(R_{cell,act})_{cur}$ after the elapse of the operation time t of the fuel cell 1, the true electrolyte membrane resistance value $(R_{mem})_{tru}$ not including the above influence due to the deterioration can be obtained by subtracting the difference $\Delta R_e(t)$ from this current high-frequency impedance value $(R_{cell,act})_{cur}$.

According to the state detection device for fuel cell relating to the present embodiment described above, the following effects can be achieved.

According to the present embodiment, the controller 6 further functions as an electrolyte membrane resistance estimation unit estimating electrolyte membrane resistance value $R_{mem}$. The controller 6 obtains the difference $\Delta R_e(t)$ of the actually measured high-frequency impedance value $R_{cell,act}$ by comparing the reference electrolyte membrane resistance value $(R_{mem})_{cri}$ set on the basis of the estimated ionomer resistance value $R_{ion}$ or the relationship between $(R_{ion})_{tru}$ and the degree of wetness w of the fuel cell 1 and the post-deterioration actually measured high-frequency impedance value $(R_{cell,act})_t$ estimated after the fuel cell 1 is operated for a predetermined time following this setting, and obtains the true electrolyte membrane resistance value $(R_{mem})_{tru}$ by subtracting this difference $\Delta R_e(t)$ from the current measurement value $(R_{cell,act})_{cur}$ of the actually measured high-frequency impedance value.

According to this, the difference $\Delta R_e(t)$ of the electrolyte membrane resistance value caused by an increase of the electron transport resistance due the deterioration of the electronic component such as the gas diffusion layers 113B or the separator 13 of the fuel cell 1 can be estimated with high accuracy. By making a correction by removing this difference $\Delta R_e(t)$ from the actually measured high-frequency impedance value, the actually measured high-frequency impedance value can be highly accurately matched with the actual electrolyte membrane resistance value. As a result, various controls of the fuel cell 1 can be more suitably executed by using the actually measured high-frequency impedance value corrected in this way as the true electrolyte membrane resistance value.

(Fourth Embodiment)

A fourth embodiment is described below. It should be noted that the same elements as in the first, second or third embodiment are denoted by the same reference signs and not described. In the present embodiment, a process is performed which determines whether two or more frequencies used in impedance measurement belong to an arc region or to a non-arc region of an actually measured impedance curve C2.

Specifically, whether the frequencies for impedance measurement used in obtaining the supposed high-frequency impedance value $R_{cell,sup}$ and the actually measured high-frequency impedance value $R_{cell,act}$ described above belong to the arc region or to the non-arc region of the actually measured impedance curve C2 is properly determined in the present embodiment. This results in an improvement in the accuracy of an ionomer resistance value $R_{ion}$ obtained using these impedance values.

In the present embodiment, a process is described which determines whether certain two frequencies $\omega 1$, $\omega 2$ ($\omega 1 < \omega 2$) belong to the arc region of the actually measured impedance curve C2 or to the non-arc region L2 of the actually measured impedance curve C2 particularly for the purpose of simplifying the description. However, a method of the present embodiment can be similarly applied for three or more frequencies.

Figure 20:
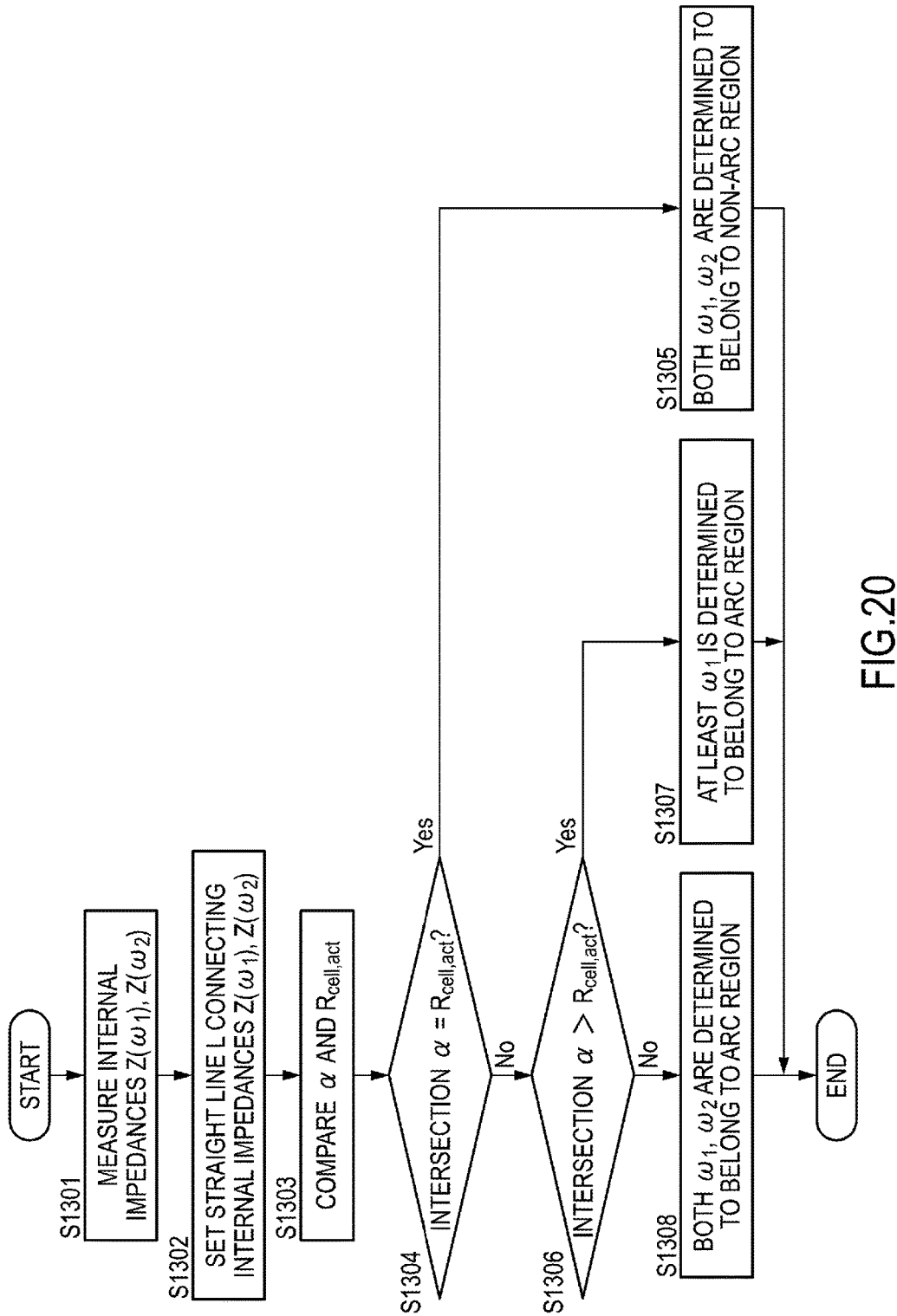
FIG. 20 is a flow chart showing the flow of determining to which of an arc region and a non-arc region a frequency belongs in the one embodiment.

FIG. 20 is a flow chart showing the flow of determining whether the two frequencies $\omega 1$, $\omega 2$ used in impedance measurement belong to the arc region of the actually measured impedance curve C2 or to the non-arc region of the actually measured impedance curve C2. A process of Steps S1301 to S1308 is performed by a controller 6.

In Step S1301, impedances $Z(\omega 1)$, $Z(\omega 2)$ at the two frequencies $\omega 1$, $\omega 2$ are measured. It should be noted that a specific method for impedance measurement is carried out, for example, in a manner similar to the impedance measurement in Steps S1021 to S1024 in FIG. 10.

In Step S1302, a straight line L connecting impedance values $Z(\omega 1)$, $Z(\omega 2)$ is set on a complex plane.

In Step S1303, a coordinate $\alpha$ of an intersection of the straight line L and a real axis and an actually measured high-frequency impedance value $R_{cell,act}$ are compared in magnitude.

If it is determined in Step S1304 that the coordinate $\alpha$ of the above intersection substantially matches the actually measured high-frequency impedance value $R_{cell,act}$, an advance is made to Step S1305 and the both frequencies $\omega 1$ and $\omega 2$ are determined to belong to the non-arc region L2.

Figure 21:
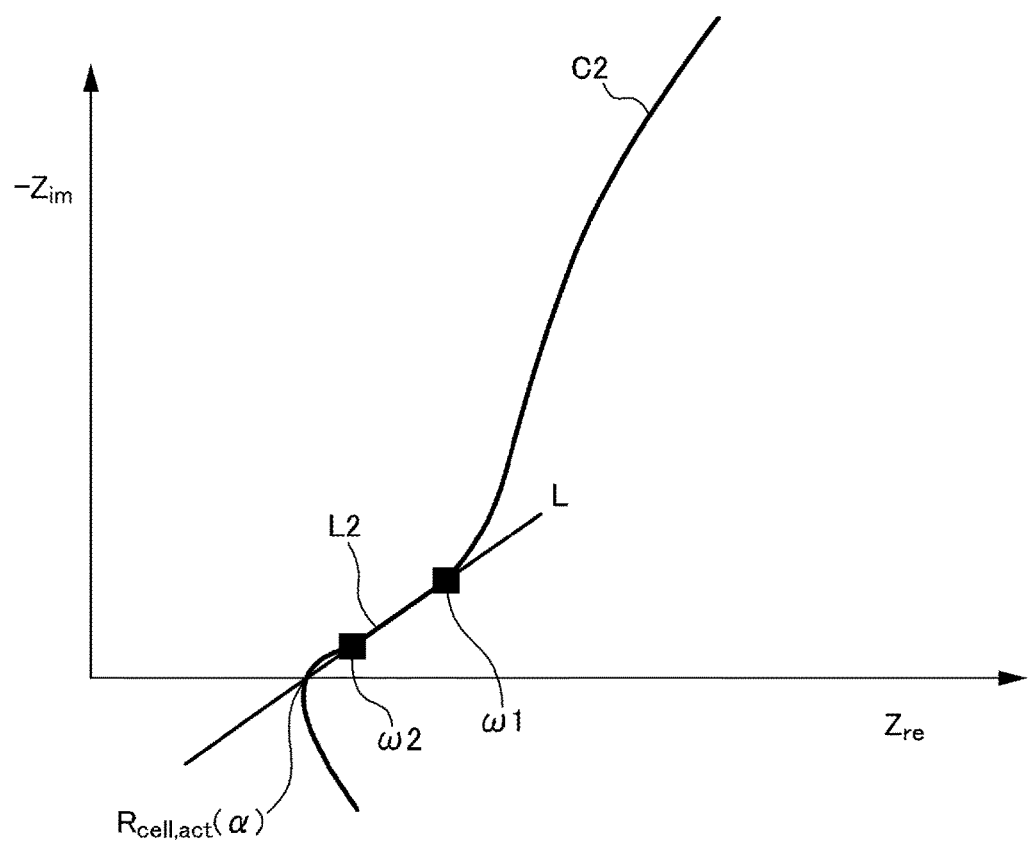
FIG. 21 is a graph showing a mode of determining to which of the arc region and the non-arc region the frequency belongs.

FIG. 21 shows a mode in which the coordinate $\alpha$ of the intersection of the straight line L and the real axis matches the actually measured high-frequency impedance value $R_{cell,act}$.

As is clearly understood from FIG. 21, since the non-arc region L2 of the actually measured impedance curve C2 is formed as a straight line part, the straight line L connecting the impedance values $Z(\omega 1)$, $Z(\omega 2)$ matches the non-arc region L2 if the coordinate $\alpha$ of the intersection of the straight line L and the real axis and the actually measured high-frequency impedance value $R_{cell,act}$ substantially match. Thus, the impedance values $Z(\omega 1)$, $Z(\omega 2)$ on the straight line L are inevitably present on the non-arc region L2.

On the other hand, if it is determined in Step S1304 described above that the coordinate $\alpha$ does not substantially match the actually measured high-frequency impedance value $R_{cell,act}$, an advance is made to Step S1306 to determine whether or not the coordinate $\alpha$ is larger than the actually measured high-frequency impedance value $R_{cell,act}$.

If the coordinate $\alpha$ of the intersection is determined to be larger than the actually measured high-frequency impedance value $R_{cell,act}$, an advance is made to Step S1307 and at least the frequency $\omega 1$ having a relatively small value is determined to belong to the arc region.

Figure 22:
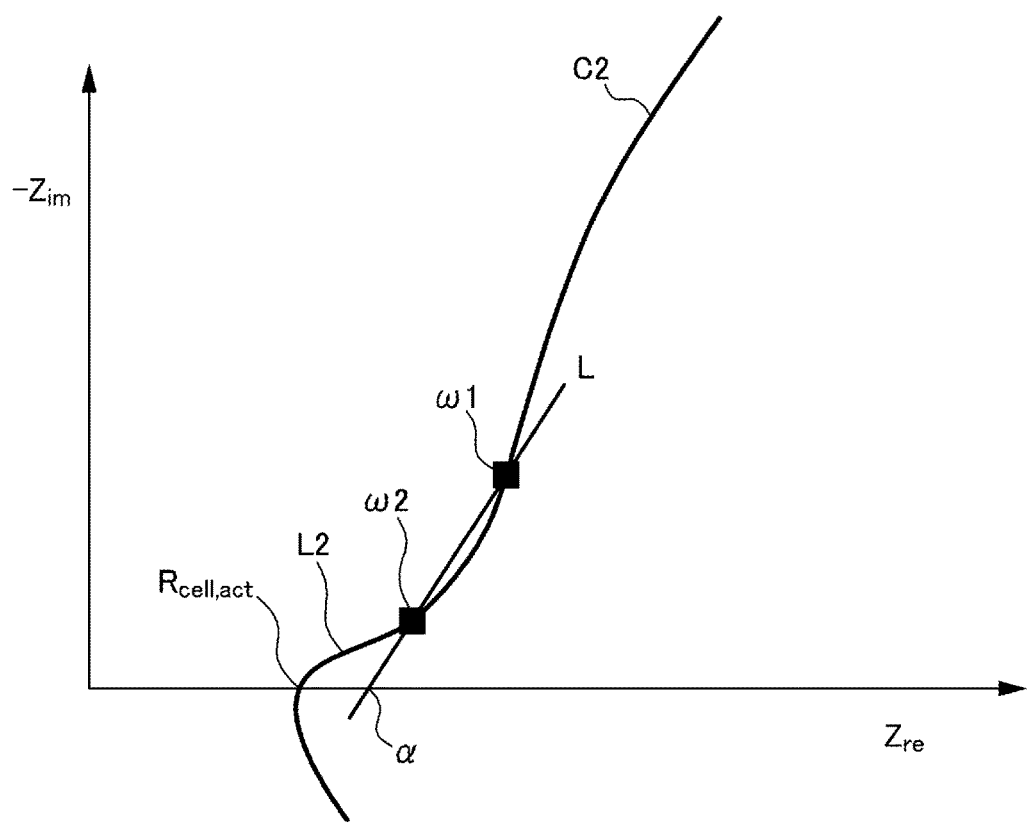
FIG. 22 is a graph showing a mode of determining to which of the arc region and the non-arc region the frequency belongs.

FIG. 22 shows a mode in which the coordinate $\alpha$ of the intersection of the straight line L and the real axis is larger than the actually measured high-frequency impedance value $R_{cell,act}$. As is clear also from FIG. 22, the frequency $\omega 1$ belongs to the arc region. On the other hand, although the frequency $\omega 2$ is on the non-arc region L2 in FIG. 22, the frequency $\omega 2$ comes to be present on the arc region if the value of the coordinate $\alpha$ of the intersection of the straight line L and the real axis increases to a certain extent or more.

On the other hand, if the coordinate $\alpha$ of the intersection is determined to be smaller than the actually measured high-frequency impedance value $R_{cell,act}$ in Step S1306 described above, an advance is made to Step S1308 and the both frequencies $\omega 1$ and $\omega 2$ are determined to belong to the arc region.

Figure 23:
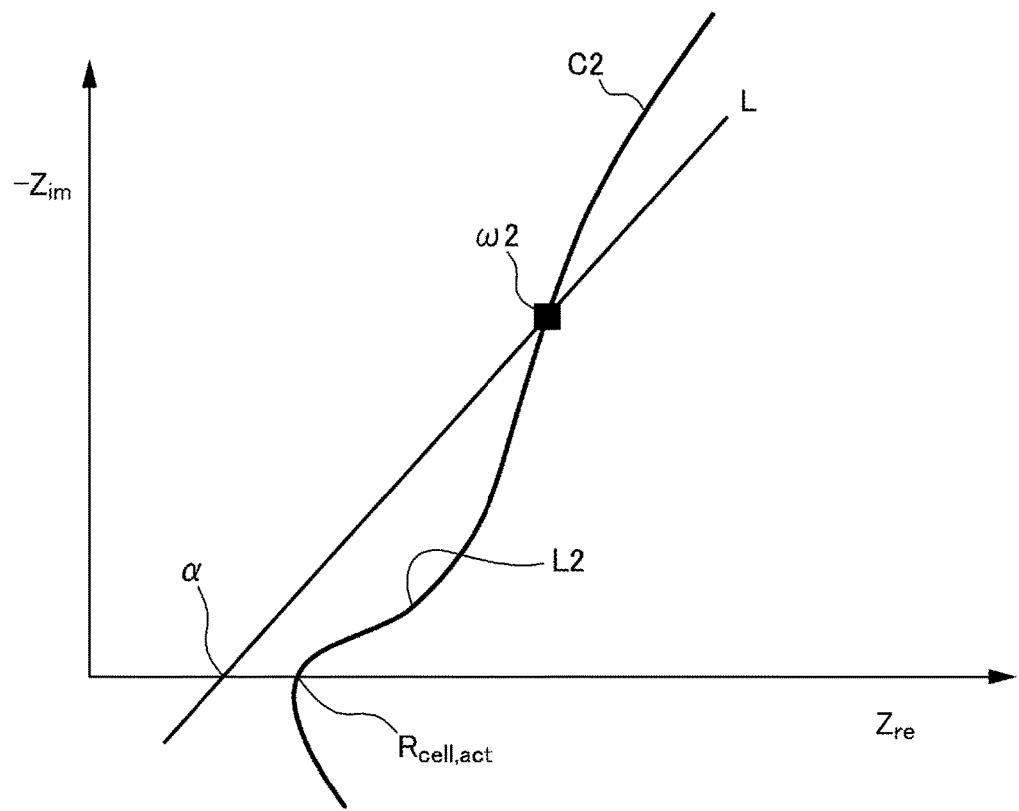
FIG. 23 is a graph showing a mode of determining to which of the arc region and the non-arc region the frequency belongs.

FIG. 23 shows a mode in which the coordinate $\alpha$ of the intersection of the straight line L and the real axis is smaller than the actually measured high-frequency impedance value $R_{cell,act}$. As is clear with reference to FIG. 23, the frequency $\omega 2$ belongs to the arc region. Thus, although not shown, $\omega 1$ smaller than the frequency $\omega 2$ also inevitably belongs to the arc region, wherefore the both frequencies $\omega 1$ and $\omega 2$ belong to the arc region.

According to the state detection device for the fuel cell 1 relating to the present embodiment described above, the following effects can be achieved.

In the present embodiment, the controller 6 functions as frequency region determination means for determining whether each of the two frequencies $\omega 1$, $\omega 2$ belongs to the non-arc region or to the arc region by comparing the intersection $\alpha$ of the straight line L connecting the impedance measurement values $Z(\omega 1)$ and $Z(\omega 2)$ measured at two frequencies $\omega 1$ and $\omega 2$ and the real axis and the actually measured high-frequency impedance value $R_{cell,act}$.

In this way, whether the two frequencies $\omega 1$, $\omega 2$ used in impedance measurement for the estimation of the ionomer resistance value $R_{ion}$ are in the arc region or in the non-arc region of the actually measured impedance curve C2 can be properly determined.

Particularly, one frequency belonging to the non-arc region (high-frequency band) and two frequencies belonging to the arc region (low frequency band) are used, for example, in the estimation of the ionomer resistance value $R_{ion}$ in Steps S101 to S103 shown in FIG. 9.

Accordingly, a contribution is made to more accurate estimation of the ionomer resistance value $R_{ion}$, for example, by determining whether each of a plurality of frequencies belongs to the non-arc region or to the arc region using the frequency region determination means according to the present embodiment and selecting one frequency belonging to the non-arc region and two frequencies belonging to the arc region.

Further, in the present embodiment, the frequency region determination means determines that both of the two frequencies $\omega 1$, $\omega 2$ belong to the non-arc region (see Step S1305) if the intersection $\alpha$ of the straight line L and the real axis substantially matches the actually measured high-frequency impedance value $R_{cell,act}$.

Here, as is clear with reference to FIG. 21, the straight line L substantially matches the straight non-arc region L2 on the actually measured impedance curve C2 if the intersection $\alpha$ of the straight line L and the real axis substantially matches the actually measured high-frequency impedance value $R_{cell,act}$. Thus, this determination can be said to be a highly accurate determination satisfactorily adapting to reality.

Particularly, in the present embodiment, at least the frequency $\omega 1$ having a relatively smaller value out of the two frequencies ω1, ω2 is determined to belong to the arc region (see Steps S1307 and S1308) if the intersection α of the straight line L and the real axis does not substantially match the actually measured high-frequency impedance value $R_{cell,act}$.

Here, as is clear with reference to FIG. 22, the frequency ω1 belongs to the arc region if the intersection α of the straight line L and the real axis does not substantially match the actually measured high-frequency impedance value $R_{cell,act}$. Thus, this determination can be said to be a highly accurate determination satisfactorily adapting to reality.

Furthermore, in the present embodiment, the frequency region determination means determines that both of the two frequencies ω1, ω2 belong to the arc region (see Step S1308 and FIG. 23) if the intersection α of the straight line L and the real axis is smaller than the actually measured high-frequency impedance value $R_{cell,act}$.

Here, as is clear with reference to FIG. 23, both of the two frequencies ω1, ω2 belong to the arc region if the intersection α of the straight line L and the real axis is smaller than the actually measured high-frequency impedance value $R_{cell,act}$. Thus, this determination can be said to be a highly accurate determination satisfactorily adapting to reality.

(Fifth Embodiment)

A fifth embodiment is described below. It should be noted that the same elements as in the first, second, third or fourth embodiment are denoted by the same reference signs and not described. In the present embodiment, in impedance measurement, a so-called excitation current application method for supplying a current I to a fuel cell 1 from a measurement current source and measuring an impedance Z=V/I on the basis of this supplied current I and a voltage V to be output is carried out instead of a configuration for superimposing an alternating-current signal on an output current and an output voltage of the fuel cell 1.

In the present embodiment, in the impedance measurement of the fuel cell 1 carried out in the first embodiment or the like, the so-called excitation current application method for supplying a current I to the fuel cell 1 from a predetermined measurement current source and calculating an impedance Z=V/I on the basis of this supplied current I and a voltage V to be output is carried out instead of a configuration for measuring an output current I and an output voltage V superimposed with an alternating-current signal.

Figure 24:
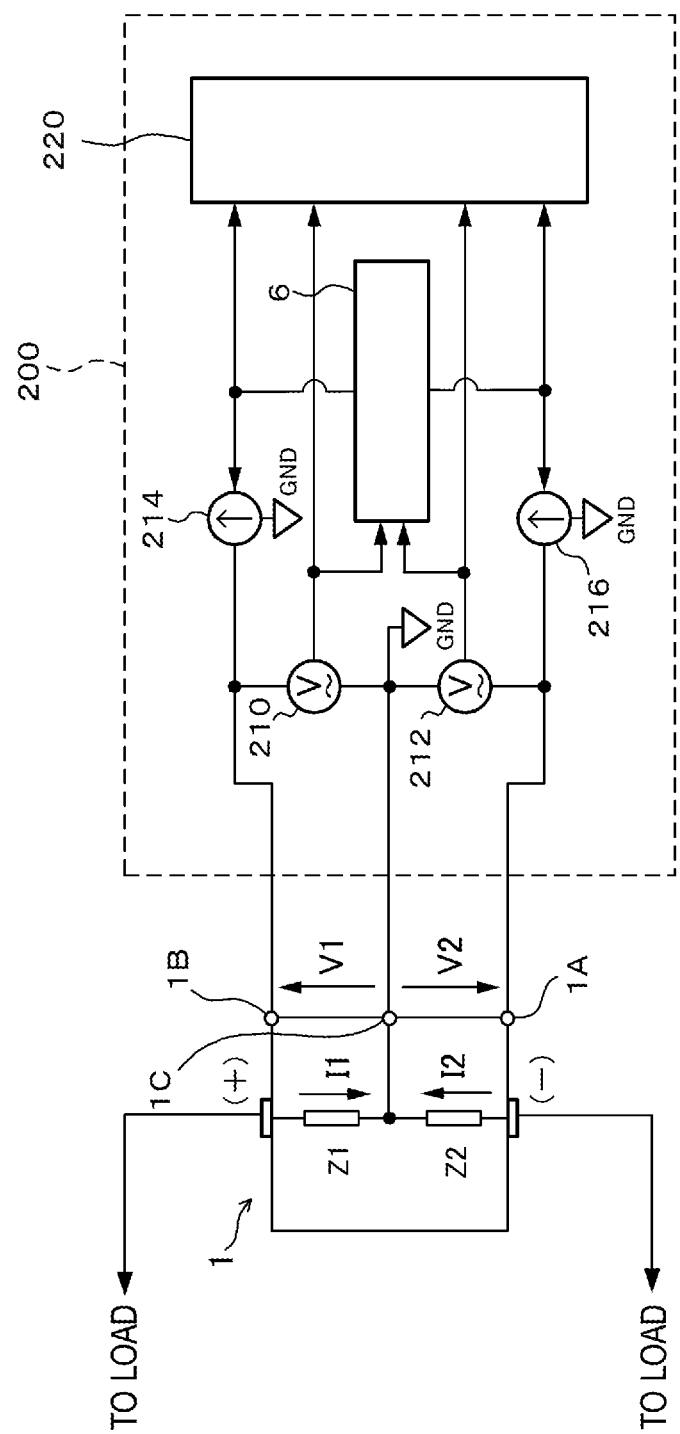
FIG. 24 is a diagram showing an impedance measurement by a so-called excitation current application method in the fuel cell system according to the one embodiment.

FIG. 24 is a block diagram schematically showing an essential part relating to impedance measurement in a fuel cell system 100 of the present embodiment.

As shown in FIG. 24, the fuel cell system 100 according to the present embodiment includes an applied alternating current adjusting unit 200 for applying an alternating current to the fuel cell 1 while adjusting the alternating current.

The applied alternating current adjusting unit 200 is connected to an intermediate terminal 1C besides a positive electrode terminal (cathode electrode side terminal) 1B and a negative electrode terminal (anode electrode side terminal) 1A of the fuel cell 1 configured as a stack. It should be noted that a part connected to the intermediate terminal 1C is grounded as shown in FIG. 24.

The applied alternating current adjusting unit 200 includes a positive-electrode side voltage measuring sensor 210 for measuring a positive-electrode side alternating current potential difference V1 of the positive electrode terminal 1B with respect to the intermediate terminal 1C and a negative-electrode side voltage measuring sensor 212 for measuring a negative-electrode side alternating current potential difference V2 of the negative electrode terminal 1A with respect to the intermediate terminal 1C.

Further, the applied alternating current adjusting unit 200 includes a positive-electrode side alternating current power supply unit 214 for applying an alternating current I1 to a circuit composed of the positive electrode terminal 1B and the intermediate terminal 1C, a negative-electrode side alternating current power supply unit 216 for applying an alternating current I2 to a circuit composed of the negative electrode terminal 1A and the intermediate terminal 1C, a controller 6 for adjusting amplitudes and phases of these alternating currents I1 and I2, and a computation unit 220 for computing the impedance Z of the fuel cell 1 on the basis of the positive-electrode side alternating current potential differences V1, the negative-electrode side alternating current potential difference V2, and the alternating currents I1, I2.

In the present embodiment, the controller 6 adjusts the amplitudes and phases of the alternating currents I1, I2 so that the positive-electrode side alternating current potential difference V1 and the negative-electrode side alternating current potential difference V2 become equal.

Further, the computation unit 220 has hardware configuration such as an unillustrated AD converter and a microcomputer chip and software configuration such as a program for calculating the impedance, calculates an impedance Z1 from the intermediate terminal 1C to the positive electrode terminal 1B by dividing the positive-electrode side alternating current potential difference V1 by the alternating current I1 and calculates an impedance Z2 from the intermediate terminal 1C to the negative electrode terminal 1A by dividing the negative-electrode side alternating current potential difference V2 by the alternating current I2. Further, the computation unit 220 calculates the total impedance Z of the fuel cell 1 by taking the sum of the impedances Z1 and Z2.

According to the state detection device for the fuel cell 1 relating to the present embodiment described above, the following effects can be achieved.

The state detection device for fuel cell relating to the present embodiment includes the alternating current power supply units 214, 216 connected to the fuel cell 1 and configured to output the alternating currents I1, I2 to the fuel cell 1, the controller 6 serving as an alternating current adjusting unit configured to adjust the alternating currents I1 and I2 on the basis of the positive-electrode side alternating current potential difference V1, which is a potential difference obtained by subtracting a potential of the intermediate part 1C from a potential on the positive-electrode side 1B of the fuel cell 1, and the negative-electrode side alternating current potential difference V2, which is a potential difference obtained by subtracting the potential of the intermediate part 1C from a potential on the negative-electrode side 1A of the fuel cell 1, and the impedance computation unit 220 for computing the impedance Z of the fuel cell 1 on the basis of the adjusted alternating currents I1, I2 and the positive-electrode side alternating current potential difference V1 and the negative-electrode side alternating current potential difference V2.

The controller 6 adjusts the amplitudes and phases of the alternating current I1 applied by the positive-electrode side alternating current power supply unit 214 and the alternating current I2 applied by the negative-electrode side alternating current power supply unit 216 such that the positive-electrode side alternating current potential difference V1 on the positive-electrode side of the fuel cell 1 and the negative-electrode side alternating current potential difference V2 on the negative-electrode side substantially match. Since the amplitude of the positive-electrode side alternating current potential difference V1 and that of the negative-electrode side alternating current potential difference V2 become equal in this way, the positive electrode terminal 1B and the negative electrode terminal 1A are substantially at an equal potential. Thus, the flow of the alternating currents I1, I2 for impedance measurement to a travel motor 53 is prevented, wherefore power generation by the fuel cell 1 is prevented from being affected.

Further, in the case of conducting a measurement when the fuel cell 1 is in a power generation state in impedance measurement according to the present embodiment, an alternating current potential for measurement is superimposed on a voltage generated by the power generation. Thus, the values of the positive-electrode side alternating current potential difference V1 and the negative-electrode side alternating current potential difference V2 themselves increase. However, since the phases and amplitudes of the positive-electrode side alternating current potential difference V1 and the negative-electrode side alternating current potential difference V2 themselves are not changed, a highly accurate impedance measurement can be conducted as when the fuel cell 1 is not in the power generating state.

Although the embodiments of the present invention have been described above, the above embodiments are merely an illustration of some application examples of the present invention and not intended to limit the technical scope of the present invention to the specific configurations of the above embodiments.

For example, an arbitrary combination of the elements of the above first to fifth embodiments is included within the scope of the gist of the present invention.

The invention claimed is:

1. A state detection device for fuel cell, comprising a controller programmed to:
   set a predetermined high-frequency impedance value on the basis of an impedance measurement value belonging to an arc region of an impedance curve of the fuel cell;
   obtain an actually measured high-frequency impedance value on the basis of an impedance measurement value belonging to a non-arc region of the impedance curve of the fuel cell;
   estimate a value obtained by subtracting the actually measured high-frequency impedance value from the predetermined high-frequency impedance value as an ionomer resistance value; and
   set a value of an intersection of an equivalent circuit impedance curve set on the basis of an impedance measurement value belonging to the arc region and a real axis as the predetermined high-frequency impedance value.

2. The state detection device for fuel cell according to claim 1, wherein:
   the equivalent circuit impedance curve is set by applying the impedance measurement value belonging to the arc region to an equation for impedance obtained from an equivalent circuit of the fuel cell.

3. The state detection device for fuel cell according to claim 2, wherein:
   the equivalent circuit impedance curve is set by applying real parts and imaginary parts of impedance measurement values at two or more frequencies in the arc region to an equation for impedance real part:

$$R_{cell,sup} = Z_{re} - \frac{R_{act}}{1 + \omega^2 C_{dl}^2 R_{act}^2} \quad \text{[Equation 1]}$$

and
   an equation for imaginary part obtained from the equivalent circuit:

$$-\frac{1}{\omega Z_{im}} = \frac{1}{\omega^2 C_{dl} R_{act}^2} + C_{dl} \quad \text{[Equation 2]}$$

where $Z_{re}$, $Z_{im}$ respectively denote the real part and the imaginary part of the impedance of the fuel cell, $\omega$ denotes an angular frequency of an alternating-current signal, $R_{cell,sup}$ denotes the predetermined high-frequency impedance value, $R_{act}$ denotes a reaction resistance of a cathode electrode and $C_{dl}$ denotes an electrical double layer capacitance of the cathode electrode.

4. The state detection device for fuel cell according to claim 1 wherein the controller is further programmed to:
   obtain an increase of an ionomer resistance value by comparing a reference value of the ionomer resistance value estimated under a reference operating condition and a post-deterioration ionomer resistance value estimated after the fuel cell is operated for a predetermined time from an estimated value under the reference operating condition; and
   make a correction by subtracting the increase from a current estimated value of the ionomer resistance value.

5. The state detection device for fuel cell according to claim 4, wherein:
   the state detection device detects a deteriorated state of a catalyst layer of the fuel cell on the basis of the current estimated value of the ionomer resistance value, which has been corrected.

6. The state detection device for fuel cell according to claim 1, wherein the controller is further programmed to:
   estimate an electrolyte membrane resistance value;
   compare a reference electrolyte membrane resistance value set on the basis of a relationship between the estimated ionomer resistance value and a wet/dry state of the fuel cell and a post-deterioration actually measured high-frequency impedance value estimated after the fuel cell is operated for a predetermined time from the set to obtain a difference between these; and
   make a correction by subtracting the difference from a current measurement value of the actually measured high-frequency impedance value.

7. The state detection device for fuel cell according to claim 1, wherein the controller is further programmed to:
   obtain two or more candidates for the predetermined high-frequency impedance value on the basis of two or more impedance measurement values belonging to the arc region; and
   set an average value of the two or more candidates for the predetermined high-frequency impedance value as the predetermined high-frequency impedance value.

8. The state detection device for fuel cell according to claim 1, wherein the controller is further programmed to:
   obtain two or more candidates for the actually measured high-frequency impedance value on the basis of two or more impedance measurement values belonging to the non-arc region; and
   set an average value of the two or more candidates for the actually measured high-frequency impedance value as the actually measured high-frequency impedance value.

9. The state detection device for fuel cell according to claim 1, wherein the controller is further programmed to:
obtain two or more candidates for the predetermined high-frequency impedance value on the basis of two or more impedance measurement values belonging to the arc region; and
set a higher value out of the two or more candidates for the predetermined high-frequency impedance value as the predetermined high-frequency impedance value.

10. The state detection device for fuel cell according to claim 1, wherein the controller is further programmed to:
obtain two or more candidates for the actually measured high-frequency impedance value on the basis of two or more impedance measurement values belonging to the non-arc region; and
set a lower value out of the two or more candidates for the actually measured high-frequency impedance value as the actually measured high-frequency impedance value.

11. The state detection device for fuel cell according to claim 1, wherein the controller is further programmed to:
obtain two or more candidates for the predetermined high-frequency impedance value on the basis of two or more impedance measurement values belonging to the arc region; and
set a lower value out of the two or more candidates for the predetermined high-frequency impedance value as the predetermined high-frequency impedance value.

12. The state detection device for fuel cell according to claim 1, wherein the controller is further programmed to:
obtain two or more candidates for the actually measured high-frequency impedance value on the basis of two or more impedance measurement values belonging to the non-arc region; and
set a higher value out of the two or more candidates for the actually measured high-frequency impedance value as the actually measured high-frequency impedance value.

13. The state detection device for fuel cell according to claim 1, wherein the controller is further programmed to compare a value of an intersection of a straight line connecting impedance measurement values measured at two or more frequencies and a real axis and the actually measured high-frequency impedance value to determine whether each of the two or more frequencies belongs to the non-arc region or to the arc region.

14. The state detection device for fuel cell according to claim 13, wherein the controller is further programmed to determine that all of the two or more frequencies belong to the non-arc region if the value of the intersection of the straight line and the real axis and the actually measured high-frequency impedance value substantially match.

15. The state detection device for fuel cell according to claim 13, wherein the controller is further programmed to determine that at least one frequency having a relatively small value out of the two or more frequencies belongs to the arc region if the value of the intersection of the straight line and the real axis and the actually measured high-frequency impedance value do not substantially match.

16. The state detection device for fuel cell according to claim 15, wherein the controller is further programmed to determine that all of the two or more frequencies belong to the arc region if the value of the intersection is smaller than the actually measured high-frequency impedance value.

17. The state detection device for fuel cell according to claim 1, wherein:
the fuel cell is configured as a laminated battery;
the state detection device further comprises an alternating current power supply connected to the laminated battery, the alternating current power supply outputting an alternating current to the laminated battery; and
the controller is further programmed to
adjust the alternating current on the basis of a positive-electrode side alternating current potential difference and a negative-electrode side alternating current potential difference, the positive-electrode side alternating current potential difference being a potential difference obtained by subtracting a potential of an intermediate part of the laminated battery from a potential on a positive-electrode side of the laminated battery, the negative-electrode side alternating current potential difference being a potential difference obtained by subtracting the potential of the intermediate part from a potential on a negative-electrode side of the fuel cell; and
compute the impedance measurement value of the fuel cell on the basis of the adjusted alternating current and the positive-electrode side alternating current potential difference and the negative-electrode side alternating current potential difference.

18. A state detection method for fuel cell, comprising:
a predetermined high-frequency impedance value setting step of setting a predetermined high-frequency impedance value on the basis of an impedance measurement value belonging to an arc region of an impedance curve of the fuel cell;
an actually measured high-frequency impedance value calculation step of obtaining an actually measured high-frequency impedance value on the basis of an impedance measurement value belonging to a non-arc region of the impedance curve of the fuel cell; and
an ionomer resistance estimation step of estimating a value obtained by subtracting the actually measured high-frequency impedance value from the predetermined high-frequency impedance value as an ionomer resistance value;
a value of an intersection of an equivalent circuit impedance curve set on the basis of an impedance measurement value belonging to the arc region and a real axis being set as the predetermined high-frequency impedance value in the predetermined high-frequency impedance value setting step.

* * * * *